United States Patent
Denoue et al.

(10) Patent No.: US 9,785,240 B2
(45) Date of Patent: Oct. 10, 2017

(54) SYSTEMS AND METHODS FOR CONTENT-AWARE SELECTION

(71) Applicant: FUJI XEROX CO., LTD., Tokyo (JP)

(72) Inventors: Laurent Denoue, Verona (IT); Scott Carter, Los Altos, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 387 days.

(21) Appl. No.: 13/846,840

(22) Filed: Mar. 18, 2013

(65) Prior Publication Data

US 2014/0282242 A1    Sep. 18, 2014

(51) Int. Cl.
*G06F 3/01*        (2006.01)
*G06F 3/0488*      (2013.01)
(Continued)

(52) U.S. Cl.
CPC ............ *G06F 3/017* (2013.01); *G06F 3/0488* (2013.01); *G06F 3/04842* (2013.01); *G06F 17/277* (2013.01)

(58) Field of Classification Search
CPC .... G06F 3/0483; G06F 3/04883; G06F 3/017; G06F 3/0488; G06F 3/03547; G06F 3/04842; G06F 3/0481; G06F 3/0485; G06F 3/0416; G06F 3/147; G06F 3/0482; G06F 2203/04808; H04N 1/00381; G07F 17/3211
(Continued)

(56) References Cited

U.S. PATENT DOCUMENTS 5,881,169 A * 3/1999 Henry, Jr. ............. G06F 17/276
                                                   382/187
7,411,575 B2 * 8/2008 Hill ........................ G06F 3/0421
                                                   345/156
(Continued)

FOREIGN PATENT DOCUMENTS

WO    WO-2014013949 A1    1/2014

OTHER PUBLICATIONS

John Adcock, Matthew Cooper, Laurent Denoue, Hamed Pirsiavash, and Lawrence A. Rowe. TalkMiner: A lecture webcast search engine. ACM MM 2010. pp. 241-250.
(Continued)

*Primary Examiner* — Weilun Lo
*Assistant Examiner* — Carl Lobo
(74) *Attorney, Agent, or Firm* — TransPacific Law Group; Pavel I. Pogodin, Esq.

(57) ABSTRACT

Systems and methods detect simple user gestures to enable selection of portions of segmented content, such as text, displayed on a display. Gestures may include finger (such as thumb) flicks or swipes as well as flicks of the handheld device itself. The used finger does not occlude the selected text, allowing users to easily see what the selection is at any time during the content selection process. In addition, the swipe or flick gestures can be performed by a non-dominant finger such as a thumb, allowing users to hold the device and make the selection using only one hand. After making the initial selection of a target portion of the content, to extend the selection, for example to the right, the user simply swipes or flicks the finger over the touchscreen to the right. The user could also flick the entire device in a move gesture with one hand.

19 Claims, 20 Drawing Sheets

(51) Int. Cl.
*G06F 3/0484* (2013.01)
*G06F 17/27* (2006.01)
(58) Field of Classification Search
USPC .......................................................... 715/810
See application file for complete search history.

(56) References Cited

U.S. PATENT DOCUMENTS

| | | | |
|---|---|---|---|
| 8,204,199 B2* | 6/2012 | Jorasch et al. ........... 379/207.04 |
| 8,205,168 B1* | 6/2012 | Van Slembrouck .......... 715/786 |
| 8,347,232 B1* | 1/2013 | Prud'Hommeaux et al. .............................. 715/833 |
| 8,375,336 B2* | 2/2013 | Matthews ............. G06F 3/0488 715/863 |
| 8,584,049 B1* | 11/2013 | Zhai .......................... G06F 3/01 715/702 |
| 8,661,339 B2* | 2/2014 | Weeldreyer ........... G06F 3/0488 715/252 |
| 9,032,338 B2* | 5/2015 | Murrett .................... G06F 3/041 715/780 |
| 9,098,127 B2* | 8/2015 | Rana ....................... G06F 3/033 |
| 9,354,805 B2* | 5/2016 | Thorsander ........... G06F 3/0488 |
| 9,400,567 B2* | 7/2016 | Weir ....................... G06F 3/033 |
| 2002/0015064 A1* | 2/2002 | Robotham ............ G06F 3/0481 715/863 |
| 2002/0097270 A1* | 7/2002 | Keely et al. ................... 345/764 |
| 2007/0150830 A1* | 6/2007 | Ording ................. G06F 3/0481 715/784 |
| 2008/0165141 A1* | 7/2008 | Christie ................... G06F 3/044 345/173 |
| 2008/0168388 A1* | 7/2008 | Decker ......................... 715/800 |
| 2009/0066668 A1* | 3/2009 | Kim .................... G06F 3/04883 345/173 |
| 2009/0109182 A1* | 4/2009 | Fyke ..................... G06F 3/0488 345/173 |
| 2009/0125848 A1* | 5/2009 | Keohane ............. G06F 3/04883 715/863 |
| 2009/0138810 A1* | 5/2009 | Howard et al. ............... 715/760 |
| 2009/0167700 A1* | 7/2009 | Westerman et al. .......... 345/173 |
| 2009/0228792 A1* | 9/2009 | van Os ................. G06F 3/0488 715/702 |
| 2009/0228842 A1* | 9/2009 | Westerman ......... G06F 3/04883 715/863 |
| 2009/0327974 A1* | 12/2009 | Abanami ............ G06F 3/04883 715/863 |
| 2010/0050076 A1* | 2/2010 | Roth .................... G06F 3/04883 715/702 |
| 2010/0169766 A1* | 7/2010 | Duarte et al. ................. 715/244 |
| 2010/0197352 A1* | 8/2010 | Runstedler ............ G06F 3/0233 455/566 |
| 2010/0231529 A1* | 9/2010 | Tikka .................. G06F 3/04883 345/173 |
| 2010/0235793 A1* | 9/2010 | Ording et al. ................ 715/863 |
| 2010/0254613 A1* | 10/2010 | Wu et al. ...................... 382/217 |
| 2010/0293460 A1* | 11/2010 | Budelli ............... G06F 3/04883 715/702 |
| 2010/0313126 A1* | 12/2010 | Jung ................... G06F 3/04883 715/702 |
| 2011/0043453 A1 | 2/2011 | Roth |
| 2011/0043455 A1 | 2/2011 | Roth |
| 2011/0081083 A1* | 4/2011 | Lee et al. ...................... 382/182 |
| 2011/0202835 A1* | 8/2011 | Jakobsson ............. G06F 3/0481 715/702 |
| 2011/0234503 A1* | 9/2011 | Fitzmaurice et al. ......... 345/173 |
| 2011/0260962 A1* | 10/2011 | Benko ................. G06F 3/04883 345/156 |
| 2011/0310026 A1* | 12/2011 | Davis et al. ................... 345/173 |
| 2011/0320978 A1* | 12/2011 | Horodezky ........... G06F 3/0488 715/823 |
| 2012/0019452 A1* | 1/2012 | Westerman ......... G06F 3/04883 345/173 |
| 2012/0127086 A1* | 5/2012 | Li ................................. 345/173 |
| 2012/0131516 A1* | 5/2012 | Chiu .................... G06F 3/04883 715/863 |
| 2012/0131520 A1* | 5/2012 | Tang .................... G06F 3/04842 715/863 |
| 2012/0139844 A1* | 6/2012 | Ramstein et al. ............. 345/173 |
| 2012/0144298 A1* | 6/2012 | Karlsson ....................... 715/702 |
| 2012/0144341 A1* | 6/2012 | Torigoe ............... G06F 3/04883 715/784 |
| 2012/0185787 A1* | 7/2012 | Lisse ...................... G06F 3/0485 715/762 |
| 2012/0216113 A1* | 8/2012 | Li ........................ G06K 9/00416 715/702 |
| 2012/0306772 A1* | 12/2012 | Tan ..................... G06F 3/04842 345/173 |
| 2012/0311507 A1* | 12/2012 | Murrett et al. ................ 715/863 |
| 2013/0067373 A1* | 3/2013 | Weir ....................... G06F 3/033 715/769 |
| 2013/0067392 A1* | 3/2013 | Leonard ............... G06F 3/0488 715/784 |
| 2013/0067397 A1* | 3/2013 | Kirschner et al. ............ 715/799 |
| 2013/0067400 A1* | 3/2013 | Jitkoff et al. ................. 715/800 |
| 2013/0174082 A1* | 7/2013 | Khandker ............. G06F 3/0485 715/780 |

OTHER PUBLICATIONS

Thomas M. Breuel: Two Geometric Algorithms for Layout Analysis. Document Analysis Systems 2002: pp. 188-199.
Matei Negulescu, Jamie Ruil, Yang Li, Edward Lank. Tap, swipe, or move: Attentional demands for distracted smartphone input. ACM AVI 2012. pp. 173-180.
Volker Roth, Thea Turner. Bezel swipe: Conflict-free scrolling and multiple selection on mobile touch screen devices. ACM CHI 2009. pp. 1523-1526.
Bastian Schildbach, Enrico Rukzio. Investigating selection and reading performance on a mobile phone while walking. ACM Mobile HCI 2010. pp. 93-102.
Notification of Reasons for Refusal issued by Japan Patent Office in counterpart Japanese patent application on Jul. 28, 2016.

* cited by examiner

SYSTEMS AND METHODS FOR CONTENT-AWARE SELECTION

BACKGROUND OF THE INVENTION

Technical Field

The disclosed embodiments relate in general to user interfaces of computing devices and, more specifically, to systems and methods for selecting information on touch-sensitive screens.

Description of the Related Art

Text selection on touch-sensitive screens, especially small screens of mobile computing devices, such as cell phones, is still a frustrating experience for users. FIGS. 1 and 2 illustrate a conventional tap and hold text selection technique 100 implemented in many mobile devices on the market today. In accordance with this technique, a user of a mobile device 101 first selects a desired target word, such as a word 105 within a text 102 shown on a screen of a mobile device 101 by tapping on the target word. After the target word selection is made, the user adjusts the selection span by moving two needles 103 and 104 designating the text selection boundary. The selection boundary is adjusted (repositioned) by touching either of the needles 103 and 104 with a user's finger and dragging the finger across the screen of the mobile device 101. The described conventional technique is inconvenient and slow for several reasons. First, the selection is slow because users have to first identify the target word 105 and then carefully extend their text selection using needles 103 and 104 marking the beginning and the end of the selection. Second, in order to correctly select the target word from the text 102, the user needs to zoom in. After that, because the user does not see all the text 102, the user needs to zoom out in order to select additional portion of the text 102, as shown in FIG. 2. Third, the user's finger occludes the text 102, and the small magnifier 106 shown above the current text selection 105 does not provide enough context in many cases. Finally, the user typically has to hold the device 101 with one hand and carefully adjust (reposition) the selection end points 103 and 104 with her index finger of the other hand, which is inconvenient.

As it would be appreciated by those of skill in the art, while the described conventional text selection technique works and is suitable for infrequent text selections (e.g. copying a word), the aforesaid technique is frustratingly slow when more frequent text selections are needed such as when the user reads an article and needs to highlight important parts thereof. Therefore, the conventional content selection methods are deficient and new and improved techniques are needed.

SUMMARY OF THE INVENTION

The embodiments described herein are directed to methods and systems that substantially obviate one or more of the above and other problems associated with conventional methods for selecting portions of displayed content.

In accordance with one aspect of the inventive concepts described herein, there is provided a computer-implemented method performed in a computerized system comprising a central processing unit, a display device and a memory. The inventive method involves: displaying a segmented content on the display device; detecting an initial selection of a portion of the displayed segmented content by a user and marking a boundary of the selected portion of the displayed segmented content on the display device; detecting a gesture of the user outside of the marked boundary of the selected portion of the displayed segmented content; responsive to the detecting of the gesture, using the central processing unit to reposition at least a portion of the boundary of the selected portion of the displayed content based on at least one characteristic of the gesture and the segmentation of the content; and marking the repositioned boundary of the selected portion of the segmented content on the display device.

In accordance with another aspect of the inventive concepts described herein, there is provided a non-transitory computer-readable medium embodying a set of computer-executable instructions, which, when executed in a computerized system comprising a central processing unit, a display device and a memory, cause the computerized system to perform a method involving: displaying a segmented content on the display device; detecting an initial selection of a portion of the displayed segmented content by a user and marking a boundary of the selected portion of the displayed segmented content on the display device; detecting a gesture of the user outside of the marked boundary of the selected portion of the displayed segmented content; responsive to the detecting of the gesture, using the central processing unit to reposition at least a portion of the boundary of the selected portion of the displayed content based on at least one characteristic of the gesture and the segmentation of the content; and marking the repositioned boundary of the selected portion of the segmented content on the display device.

In accordance with yet another aspect of the inventive concepts described herein, there is provided a computerized system incorporating: a user interface generation module for causing a segmented content to be displayed on a display device; an initial selection module for detecting an initial selection of a portion of the displayed segmented content by a user and causing a boundary of the selected portion of the displayed segmented content to be marked on the display device; a gesture analysis module for detecting a gesture of the user outside of the marked boundary of the selected portion of the displayed segmented content; and a selection adjustment module for, responsively to the detecting of the gesture, causing a central processing unit to reposition at least a portion of the boundary of the selected portion of the displayed content based on at least one characteristic of the gesture and a segmentation of the content and causing the repositioned boundary of the selected portion of the segmented content to be marked on the display device.

In accordance with yet another aspect of the inventive concepts described herein, there is provided a computer-implemented method performed in a computerized system comprising a central processing unit, a display device and a memory. The inventive method involves: displaying a content on the display device; detecting an initial selection of a portion of the displayed content by a user and marking a boundary of the selected portion of the displayed content on the display device; detecting a gesture of the user outside of the marked boundary of the selected portion of the displayed content; responsive to the detecting of the gesture, using the central processing unit to reposition at least a portion of the boundary of the selected portion of the displayed content based on at least one characteristic of the gesture; and marking the repositioned boundary of the selected portion of the content on the display device. If the gesture is detected upstream of the selected portion of the displayed content, a start portion of the boundary of the selected portion of the displayed content is repositioned and if the gesture is detected downstream of the selected portion of the displayed content, an end portion of the boundary of the selected portion of the displayed content is repositioned.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

Figure 1:
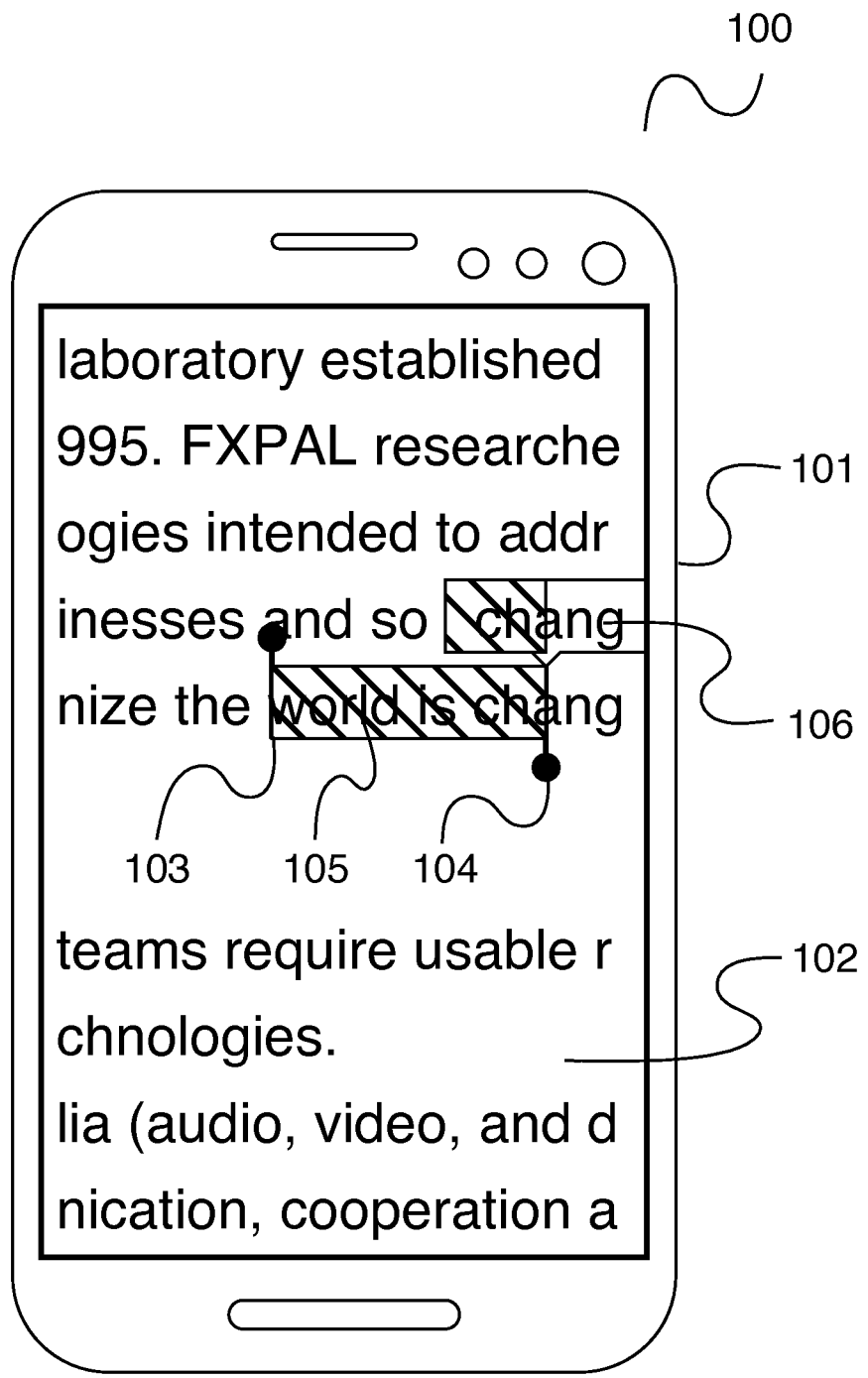
FIGS. 1 and 2 illustrate an exemplary operation of a conventional technique for text selection using a touch-sensitive screen of a mobile device.
Figure 2:
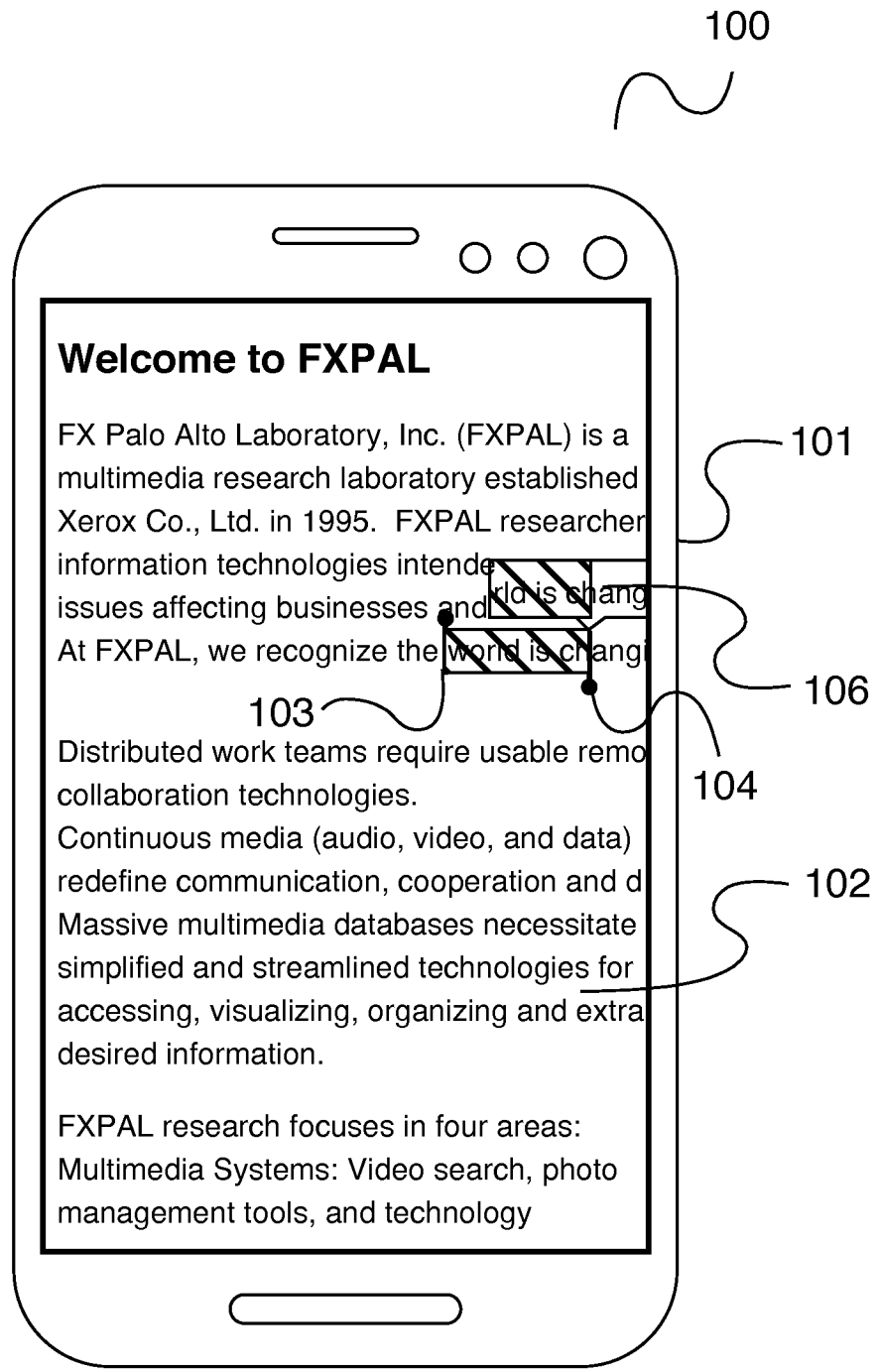

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the techniques described herein, there is provided a computerized system, an associated computer-implemented method and a computer-readable medium embodying computer-executable instructions for enabling a user to use simple gestures to select portions of a segmented content displayed on an electronic display device. In one embodiment, the inventive content selection system is applied to selecting textual content. In alternative embodiments, the inventive content selection system is applied to selecting non-textual content. In one or more embodiments, exemplary gestures that can be used by a user in connection with the inventive system to select content include finger (such as thumb) flicks or swipes as well as flicks of the entire device. Importantly, it should be noted that in the described embodiments, the finger does not occlude the selected text, allowing users to easily see what the selection is at any time during the content selection process. In addition, the aforesaid swipe or flick gestures can be performed by a non-dominant finger such as a thumb, allowing users to hold the device and make the selection using only one hand. In one or more embodiments, after making the initial selection of a target portion of the content, to extend the selection, for example to the right, the user simply swipes or flicks the finger over the touchscreen to the right. Additionally or alternatively, the user could also flick the entire device in a move gesture with one hand. Various embodiments of the described system are configured to detect user's gestures, analyze them and adjust the content selection based on the characteristics of the detected gestures.

In addition, in one or more embodiments, to facilitate the content selection process, the system can additionally use information on various levels of content segmentation. For example, in case of textual content, the text segmentation boundaries such as white spaces, end of sentences, end of expressions, punctuations, paragraph breaks or even end of chapters can be used to stop or slow down further selections of textual content upon detecting a swipe or flick gesture. This content-awareness makes it easier for users to quickly select, for example, a set of words up until a coma, but still lets them select beyond this boundary if the swipe continues, allowing them to select past the coma until the end of the sentence.

Figure 3:
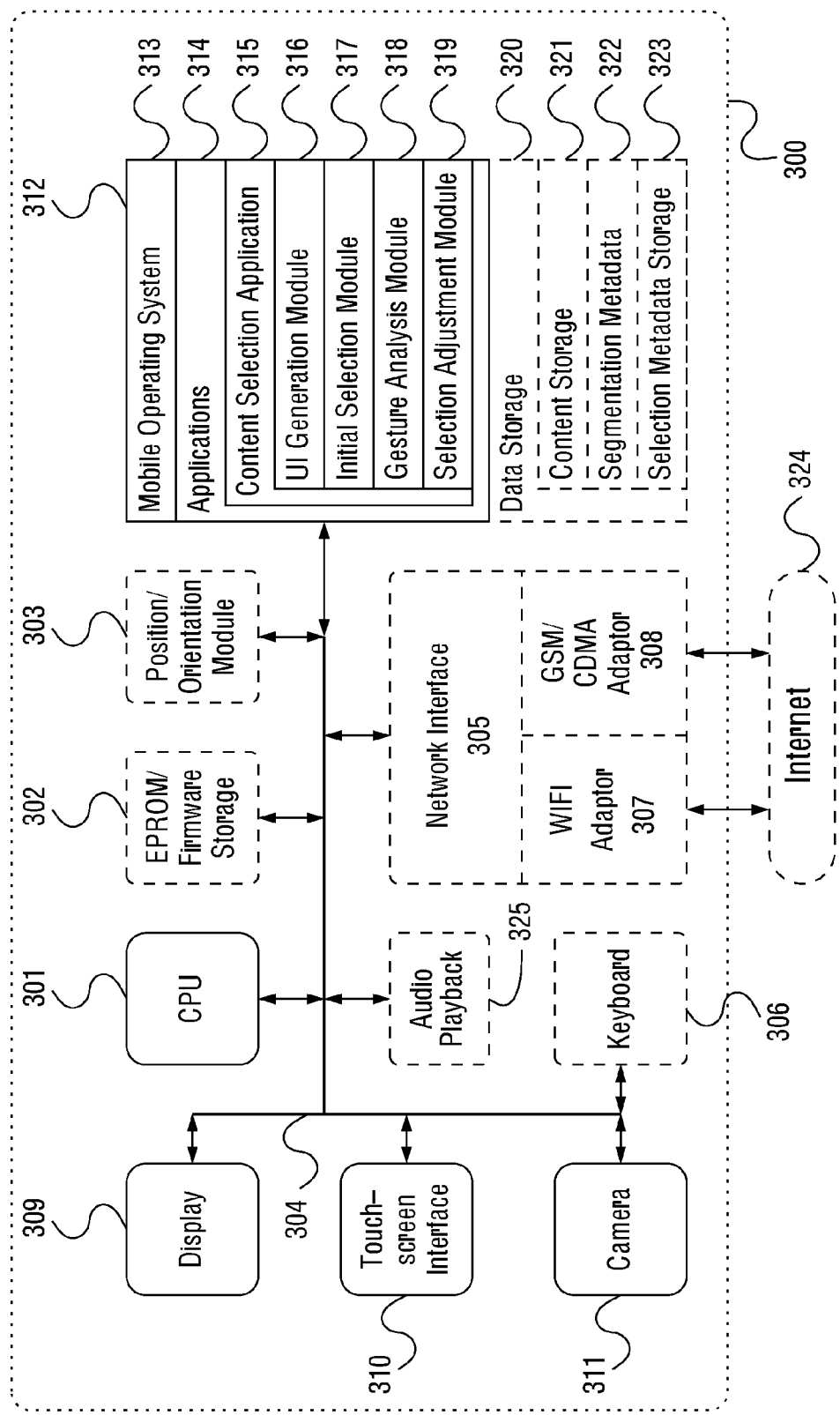
FIG. 3 illustrates an exemplary embodiment of an inventive computerized mobile system for enabling a user to select a portion of a content displayed on an electronic display device.

FIG. 3 illustrates an exemplary embodiment of a computerized system 300 for enabling a user to select a portion of a content displayed on an electronic display device. In one or more embodiments, the computerized system 300 may be implemented within the form factor of a mobile computing device, such as a smartphone, a personal digital assistant (PDA), or a tablet computer, all of which are available commercially and are well known to persons of skill in the art. In an alternative embodiment, the computerized system 300 may be implemented based on a laptop or a notebook computer. Yet in an alternative embodiment, the computerized system 300 may be an embedded system, incorporated into an electronic device with certain specialized functions, such as an electronic book (or e-book) reader. Yet in an alternative embodiment, the computerized system 300 may be implemented as a part of an augmented reality head-mounted display (HMD) systems, also well known to persons of ordinary skill in the art.

The computerized system 300 may include a data bus 304 or other interconnect or communication mechanism for communicating information across and among various hardware components of the computerized system 300, and a central processing unit (CPU or simply processor) 301 electrically coupled with the data bus 304 for processing information and performing other computational and control tasks. Computerized system 300 also includes a memory 312, such as a random access memory (RAM) or other dynamic storage device, coupled to the data bus 304 for storing various information as well as instructions to be executed by the processor 301. The memory 312 may also include persistent storage devices, such as a magnetic disk, optical disk, solid-state flash memory device or other non-volatile solid-state storage devices.

In one or more embodiments, the memory 312 may also be used for storing temporary variables or other intermediate information during execution of instructions by the processor 301. Optionally, computerized system 300 may further include a read only memory (ROM or EPROM) 302 or other static storage device coupled to the data bus 304 for storing static information and instructions for the processor 301, such as firmware necessary for the operation of the computerized system 300, basic input-output system (BIOS), as well as various configuration parameters of the computerized system 300.

In one or more embodiments, the computerized system 300 may incorporate a display device 309, which may be also electrically coupled to the data bus 304, for displaying various information to a user of the computerized system 300. In an alternative embodiment, the display device 309 may be associated with a graphics controller and/or graphics processor (not shown). The display device 309 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 309 may be incorporated into the same general enclosure with the remaining components of the computerized system 300. In an alternative embodiment, the display device 309 may be positioned outside of such enclosure.

In one or more embodiments, the display device 309 may be implemented in a form of a projector or a mini-projector configured to project information on various objects, such as glasses worn by the user or any part thereof. In one or more embodiments, the display device 309 may be configured to be mountable on the head or other suitable body part of the user. To this end, the display device 309 may be provided with suitable mounting hardware (not shown).

In one or more embodiments, the computerized system 300 may further incorporate an audio playback device 325 electrically connected to the data bus 304 and configured to play various audio files, such as MPEG-3 files, or audio tracks of various video files, such as MPEG-4 files, well known to persons of ordinary skill in the art. To this end, the computerized system 300 may also incorporate waive or sound processor or a similar device (not shown).

In one or more embodiments, the computerized system 300 may incorporate one or more input devices, such as a touchscreen interface 310 for receiving user's tactile commands, such as the aforesaid swipe or flick gestures. The touchscreen interface 310 used in conjunction with the display device 309 enables the display device 309 to possess touchscreen functionality. Thus, the display device 309 working together with the touchscreen interface 310 may be referred to herein as a touch-sensitive display device or simply as a "touchscreen."

The computerized system 300 may further incorporate a camera 311 for acquiring still images and video of various objects, including user's own hands or eyes, as well as a keyboard 306, which all may be coupled to the data bus 304 for communicating information, including, without limitation, images and video, as well as user commands (including gestures) to the processor 301. In an alternative embodiment, input devices may include a system for tracking eye movements of the user (not shown), which may be used to indicate to the computerized system 300 the command selection or gestures performed by the user. In one embodiment, input devices may also include touch-sensitive devices positioned on the back side (opposite to the front, display side) of the computerized system 300.

In one or more embodiments, the computerized system 300 may additionally include a positioning and orientation module 303 configured to supply data on the current geographical position, spatial orientation as well as acceleration of the computerized system 300 to the processor 301 via the data bus 304. The geographical position information may be obtained by the positioning module 303 using, for example, global positioning system (GPS) technology and/or other positioning techniques such as by using information provided by proximate cell towers and/or WIFI hotspots. The acceleration data is supplied by one or more accelerometers incorporated into the positioning and orientation module 303. Finally, the orientation information may be obtained using acceleration measurements in all 3 axes, including the gravity. In one or more embodiments, the position, orientation and acceleration metadata provided by the positioning and orientation module 303 is continuously recorded and stored in the data storage unit 320.

In one or more embodiments, the computerized system 300 may additionally include a communication interface, such as a network interface 305 coupled to the data bus 304. The network interface 305 may be configured to establish a connection between the computerized system 300 and the Internet 324 using at least one of a WIFI interface 307 and/or a cellular network (GSM or CDMA) adaptor 308. The network interface 305 may be configured to enable a two-way data communication between the computerized system 300 and the Internet 324. The WIFI adaptor 307 may operate in compliance with 802.11a, 802.11b, 802.11g and/or 802.11n protocols as well as Bluetooth protocol well known to persons of ordinary skill in the art. In an exemplary implementation, the WIFI adaptor 307 and the cellular network (GSM or CDMA) adaptor 308 send and receive electrical or electromagnetic signals that carry digital data streams representing various types of information.

In one or more embodiments, the Internet 324 typically provides data communication through one or more sub-networks to other network resources. Thus, the computerized system 300 is capable of accessing a variety of network resources located anywhere on the Internet 324, such as remote media servers, web servers, other content servers as well as other network data storage resources. In one or more embodiments, the computerized system 300 is configured to send and receive messages, media and other data, including application program code, through a variety of network(s) including the Internet 324 by means of the network interface 305. In the Internet example, when the computerized system 300 acts as a network client, it may request code or data for an application program executing on the computerized system 300. Similarly, it may send various data or computer code to other network resources.

In one or more embodiments, the functionality described herein is implemented by computerized system 300 in response to processor 301 executing one or more sequences of one or more instructions contained in the memory 312. Such instructions may be read into the memory 312 from another computer-readable medium. Execution of the sequences of instructions contained in the memory 312 causes the processor 301 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 301 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 301 for execution. For example, the instructions may initially be carried on a magnetic disk from a remote computer. Alternatively, a remote computer can load the instructions into its dynamic memory and send the instructions over the Internet 324. Specifically, the computer instructions may be downloaded into the memory 312 of the computerized system 300 from the aforesaid remote computer via the Internet 324 using a variety of network data communication protocols well known in the art.

In one or more embodiments, the memory 312 of the computerized system 300 may store any of the following software programs, applications or modules:

1. Operating system (OS) 313, which may be a mobile operating system for implementing basic system services and managing various hardware components of the computerized system 300. Exemplary embodiments of the operating system 313 are well known to persons of skill in the art, and may include any now known or later developed mobile operating systems.

2. Applications 314 may include, for example, a set of software applications executed by the processor 301 of the computerized system 300, which cause the computerized system 300 to perform certain predetermined functions, such as display content on the display device 309 or detect user's gestures using the touchscreen interface 310 or the camera 311. In one or more embodiments, the applications 314 may include an inventive content selection application 315, described in detail below.

3. Data storage 320 may include, for example, a content storage 321 for storing the content, such as segmented content shown to the user on the display device 309 of the computerized system 300, content segmentation metadata storage 322 as well as selection metadata storage 323 storing information on the portions of the content selected by the user using the content selection application 315.

In one or more embodiments, the inventive content selection application 315 incorporates a user interface generation module 316 configured to generate an inventive user interface on the display 309 of the computerized system 300. The inventive content selection application 315 may further include an initial selection module 317 for enabling the user to make an initial selection of a target portion of the content, a gesture analysis module 318 for detecting and analyzing user's gesture made in connection with the content, as well as a selection adjustment module 319 for adjusting the user's selection based on the detected user's gesture.

Figure 4:
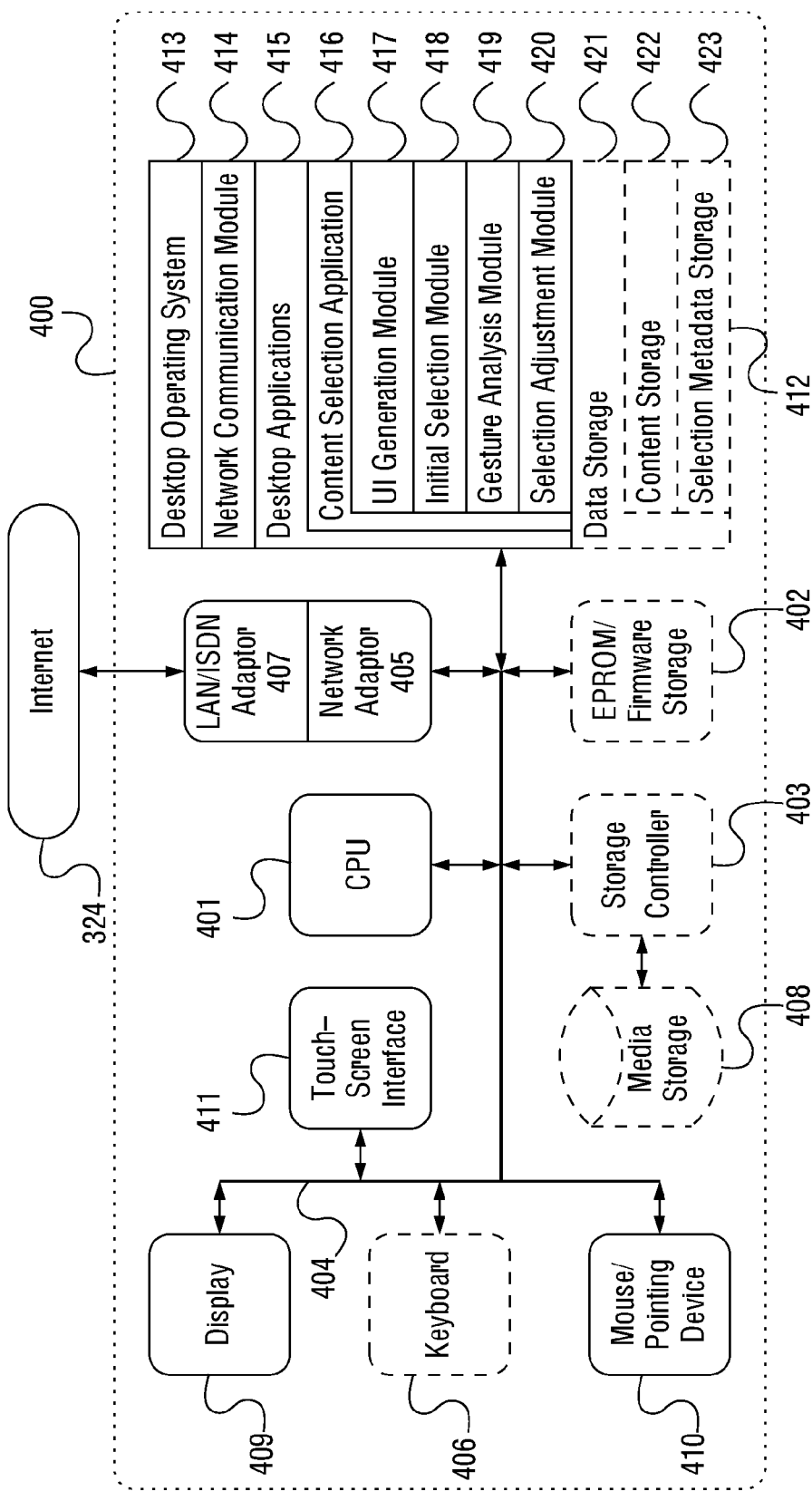
FIG. 4 illustrates an exemplary embodiment of an inventive computerized desktop system for enabling a user to select a portion of a content displayed on an electronic display device.

In an alternative embodiment, the inventive techniques for enabling a user to select a portion of a content displayed on an electronic display device described herein may be deployed on a computerized desktop system 400, an exemplary embodiment of which is illustrated in FIG. 4. In one or more embodiments, the computerized desktop system 400 may incorporate a data bus 404, which may be substantially similar and may perform substantially similar functions as the data bus 304 of the computerized system 300 illustrated in FIG. 3. In various embodiments, the data bus 404 may use the same or different interconnect and/or communication protocol as the data bus 404. The one or more processors (CPUs) 401, the network interface 405, the EPROM/Firmware storage 402, the display 409 and the keyboard 406 of the computerized desktop system 400 may be likewise substantially similar to the respective processor 301, the network interface 305, the EPROM/Firmware storage 302, the display 309 and the keyboard 306 of the computerized system 300, except that the former components are deployed in a desktop platform configuration. In various implementations, the one or more processor 401 may have substantially increased processing power as compared with the processor 301.

In addition to the input device 406 (keyboard), the computerized desktop system 400 may additionally include a touchscreen interface 411 for receiving user's tactile commands, such as the aforesaid swipe or flick gestures, a camera (not shown) for acquiring still images and video of various objects, including user's own hands or eyes, a cursor control device 410, such as a mouse, a trackball, a touchpad, or cursor direction keys for communicating direction information and command selections to the processor 401 and for controlling cursor movement on the display 409. This input device typically has two degrees of freedom in two axes, a first axis (e.g., x) and a second axis (e.g., y), that allows the device to specify positions in a plane.

The LAN/ISDN adaptor 407 of the computerized desktop system 400 may be implemented, for example, using an integrated services digital network (ISDN) card or a modem to provide a data communication connection to a corresponding type of telephone line, which is interfaced with the Internet 324 using Internet service provider's hardware (not shown). As another example, the LAN/ISDN adaptor 407 may be a local area network interface card (LAN NIC) to provide a data communication connection to a compatible LAN and the Internet 324. To store various media files, the computerized desktop system 400 may be provided with a media storage 408 connected to the data bus 404 by means of a storage controller 403.

In one or more embodiments, the memory 412 of the computerized desktop system 400 may store any of the following software programs, applications or modules:

1. Desktop operating system (OS) 413, which may be an operating system for implementing basic system services and managing various hardware components of the computerized desktop system 400. Exemplary embodiments of the desktop operating system 413 are all well known to persons of skill in the art, and may include any now known or later developed operating systems.

2. Network communication module 414 may incorporate, for example, one or more network protocol stacks which are used to establish a networking connection between the computerized desktop system 400 and the various network entities of the Internet 324, such as the computerized system 300, using the network interface 405 working in conjunction with the LAN/ISDN adaptor 407.

3. Desktop applications 415 may include, for example, a set of software applications executed by one or more processors 401 of the computerized desktop system 400, which cause the computerized desktop system 400 to perform certain predetermined functions or tasks. In one or more embodiments, the desktop applications 415 may include an inventive content selection application 416 which may operate in a substantially similar manner to the aforesaid content selection application 315 of the computerized system 300. The content selection application 416 may include a user interface generation module 417 configured to generate an inventive user interface on the display 409 of the computerized desktop system 400, an initial selection module 418 for enabling the user to make an initial selection of a target portion of the content, a gesture analysis module 419 for detecting and analyzing user's gesture made in connection with the content, as well as a selection adjustment module 420 for adjusting the user's selection based on the detected user's gesture. The aforesaid modules 417, 418, 419 and 420 of the inventive content selection application 416 may operate in a substantially similar manner to the respective modules 316, 317, 318 and 319 of the content selection application 315 deployed on the computerized system 300.

4. Data storage 421 may include, for example, a content storage 422 for storing the content, such as segmented content shown to the user on the display device 409 of the computerized desktop system 400 as well as selection metadata storage 423 storing information on the portions of the content selected by the user using the content selection application 416.

The operation of the various software modules deployed on the computerized system 300 and the computerized desktop system 400 will now be described in detail. Specifically, FIG. 5 illustrates an exemplary operating sequence 500 of an embodiment of a method for enabling a user to select a portion of a content displayed on an electronic display device.

Figure 5:
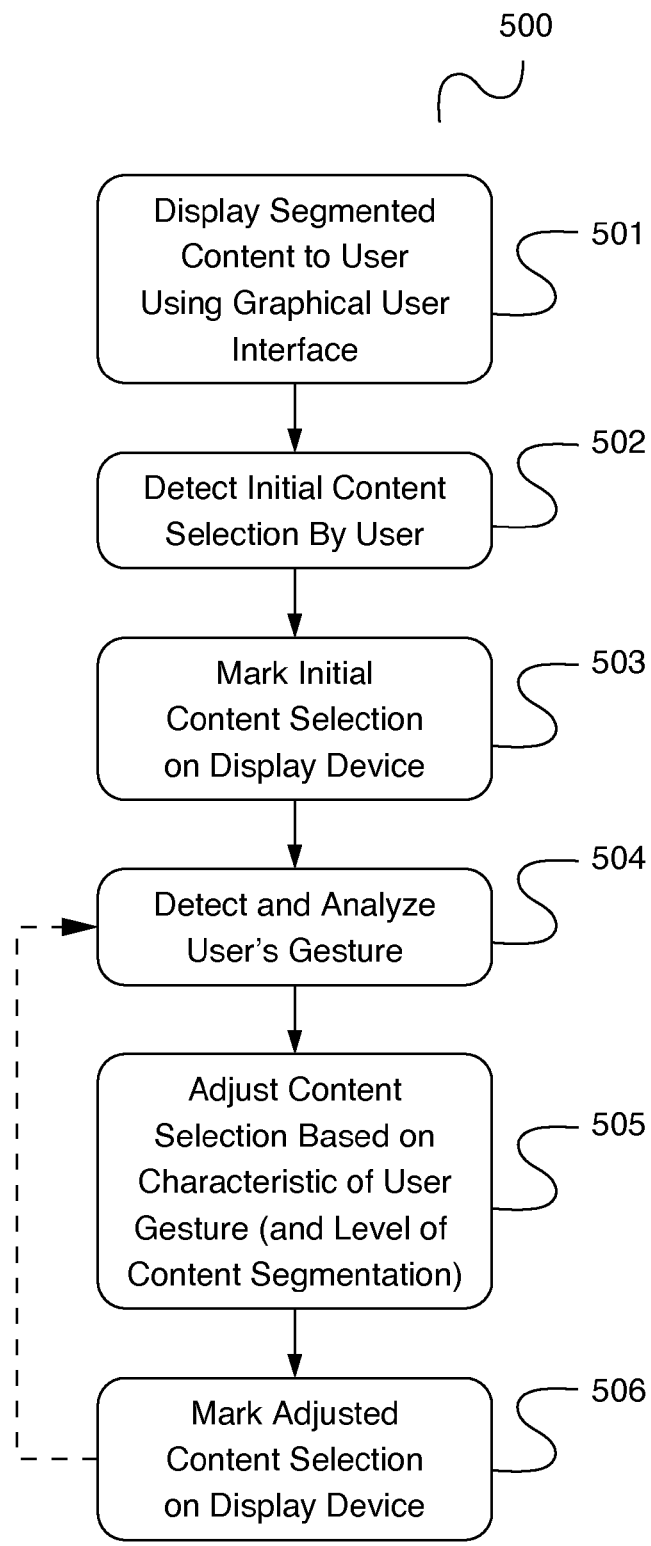
FIG. 5 illustrates an exemplary operating sequence of an embodiment of a method for enabling a user to select a portion of a content displayed on an electronic display device.

With reference to method 500 of FIG. 5, first, at step 501, the segmented content is displayed to the user using, for example, a user interface generated on the display device 309 of the computerized system 300 by the user interface generation modules 316 or 417. The displayed content may be of various types, forms or formats, including, without limitation, textual content, graphical content, including video, or any combination thereof. In one or more embodiments, the displayed content is segmented using multiple levels of segmentation. For example, in the case of a textual content, white spaces may be used as a first segmentation level separating the textual content into separate words. In addition, punctuation may be used as a second segmentation level to further segment the textual content into sentences. Yet additionally, line, paragraph and chapter breaks may further be utilized as additional segmentation levels to further segment the textual content.

Figure 6:
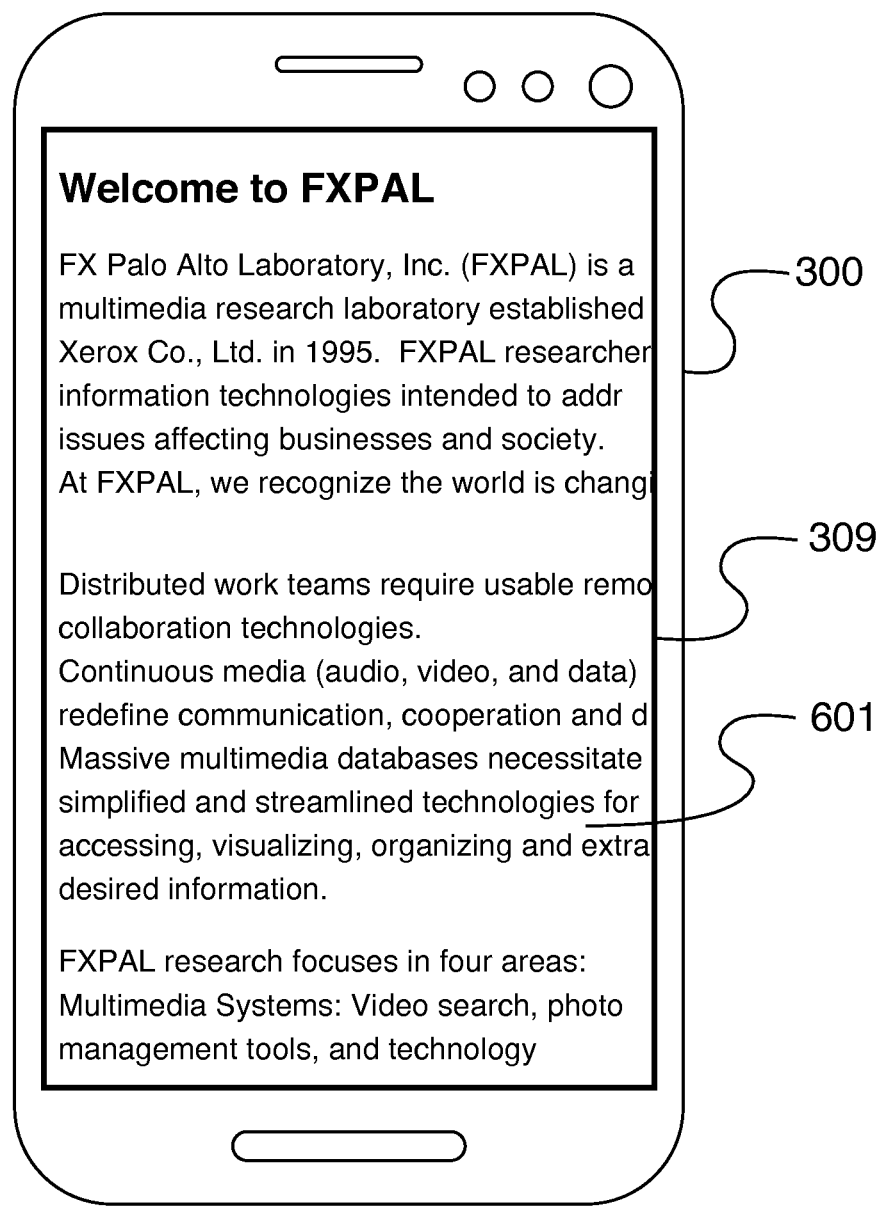
FIGS. 6, 7, 8, 9, 10, 11, 12, 13, 14 and 15 illustrate various aspects of operation of an embodiment of the inventive concepts described herein for enabling a user to select a portion of a textual content displayed on a touch-sensitive electronic display device.

For example, FIG. 6 illustrates textual content 601 displayed on the display device 309 of the computerized system 300. It should be noted that the displayed content 601 incorporates various levels of content segmentation, including white spaces, punctuation as well as line and paragraph breaks. In various embodiments, the information on the segmentation of the content, including the aforesaid multi-level segmentation, may be stored, for example, in the content segmentation metadata storage 322.

In case of a graphical content, it can be segmented by clustering together various graphical elements thereof based on spatial, contextual or temporal (time) proximity. For example, whiteboard notes made within a predetermined time interval may be grouped together into a content cluster. In another example, notes related to the same subject matter are similarly grouped together. In yet another example, slide change events may be used as an additional level of content segmentation. It should be noted, however, that a wide variety of additional methods and techniques for segmenting the content are usable in connection with the described embodiments and the inventive concepts described herein are not limited to any specific type(s) of content or the associated content segmentation methods.

Figure 7:
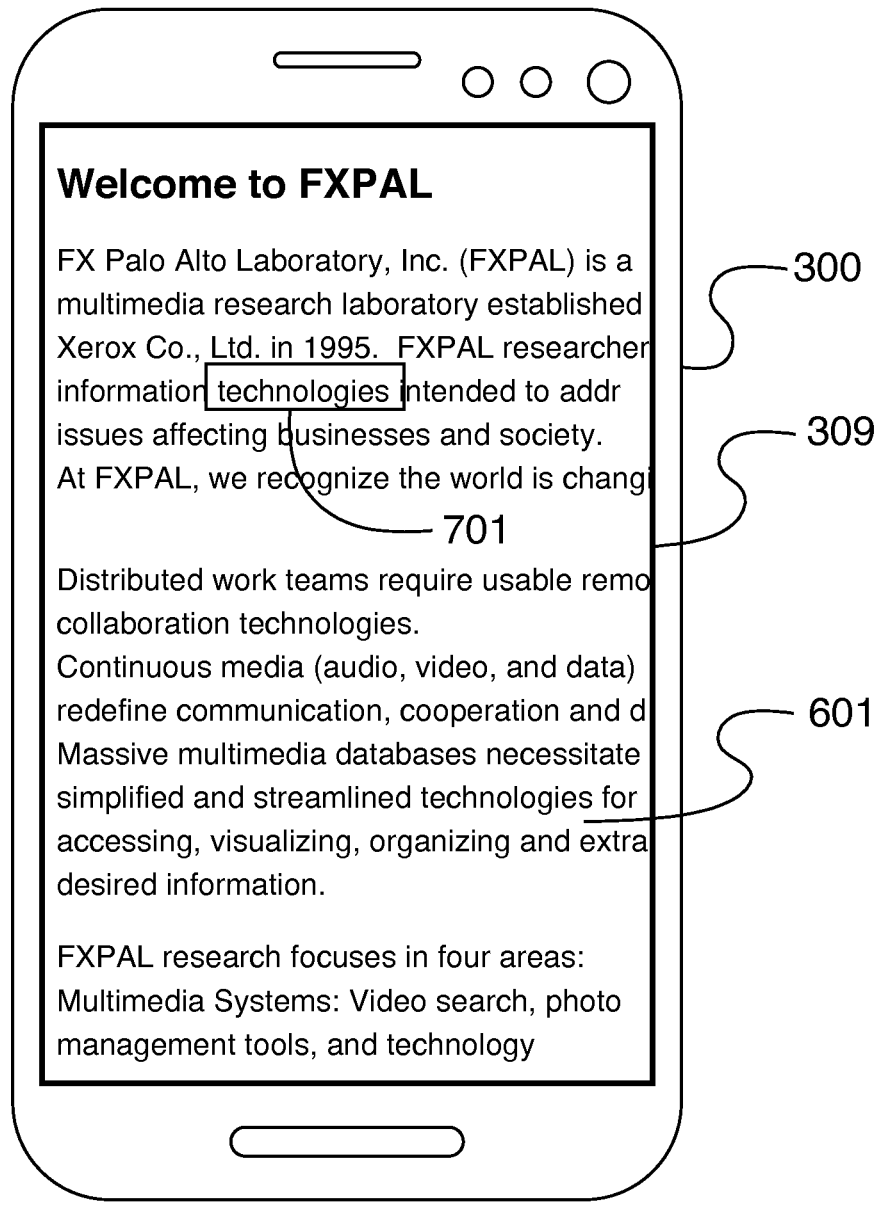

With reference to method 500 of FIG. 5, at step 502, the initial content selection module 317 or 418 detects initial content selection by the user. In one or more embodiments, the detected initial content selection event may include, for example, user's tapping or tapping and holding over the target portion of content, such as a word, displayed on the display device 309. In various embodiments, such event may be detected, for example, using the touchscreen interface 310 or 411 of the computerized system 300 or computerized desktop system 400. In one or more embodiments, information on the content segmentation may be used to identify the portion of the content selected by the user at the initial selection step 502. For example, upon the detection of the initial content selection event, the initial content selection module 317 or 418 may be configured to select a single word separated from the remaining content by white spaces. The identified initially selected content is subsequently marked on the display device 309 in step 503 of the process 500 shown in FIG. 5. For example, FIG. 7 illustrates textual content 601 displayed on the display device 309 with user-selected word "technologies" marked using a content election boundary marker 701 designating the start and the end of the content selection range (portion).

With reference to method 500 of FIG. 5, at step 504, the gesture analysis module 318 or 419 detects and analyzes user's gesture performed in connection with the displayed content 601. It should be noted that a wide variety of gestures may be used in connection with embodiments described herein and the invention is not limited to any specific gesture or types of gestures. Exemplary gestures include gestures that can be performed using fingers, hands, arms or even eyes of the user. In various embodiments, the aforesaid gesture may be detected using any now known or later developed techniques. For example, user's finger flicks or swipes on the display device may be detected using the touchscreen interface 310 or 411. The hand movements of the user may be detected using the camera 311. On the other hand, gestures involving the movements of the computerized system 300 itself (in the hands of the user) may be detected using the accelerometers or other suitable sensors embedded into the position/orientation module 303. Finally, the eye movements of the user may be detected using the camera 311. Information on the detected gestures of the user detected using the appropriate components of the computerized system 300 (400) is passed to the processor 301 (401), where it is analyzed in accordance with the functionality embedded into the gesture analysis module 318 (419).

In one or more embodiments, the detected gestures of the user are analyzed by the gesture analysis module 318 (419) based on the type, position, direction and/or amplitude of the gesture, see step 504 of the method 500 shown in FIG. 5.

Based on the gesture analysis, the content selection is adjusted in step 505, which may require repositioning of the content selection boundary. In one or more embodiments, the aforesaid content selection adjustment may be additionally based on the content segmentation, including multiple levels of segmentation, as will be described in detail below. The adjusted content selection is subsequently marked on the display device in step 506. In one or more embodiments, steps 504, 505 and 506 may be repeated as shown in FIG. 5.

Figure 8:
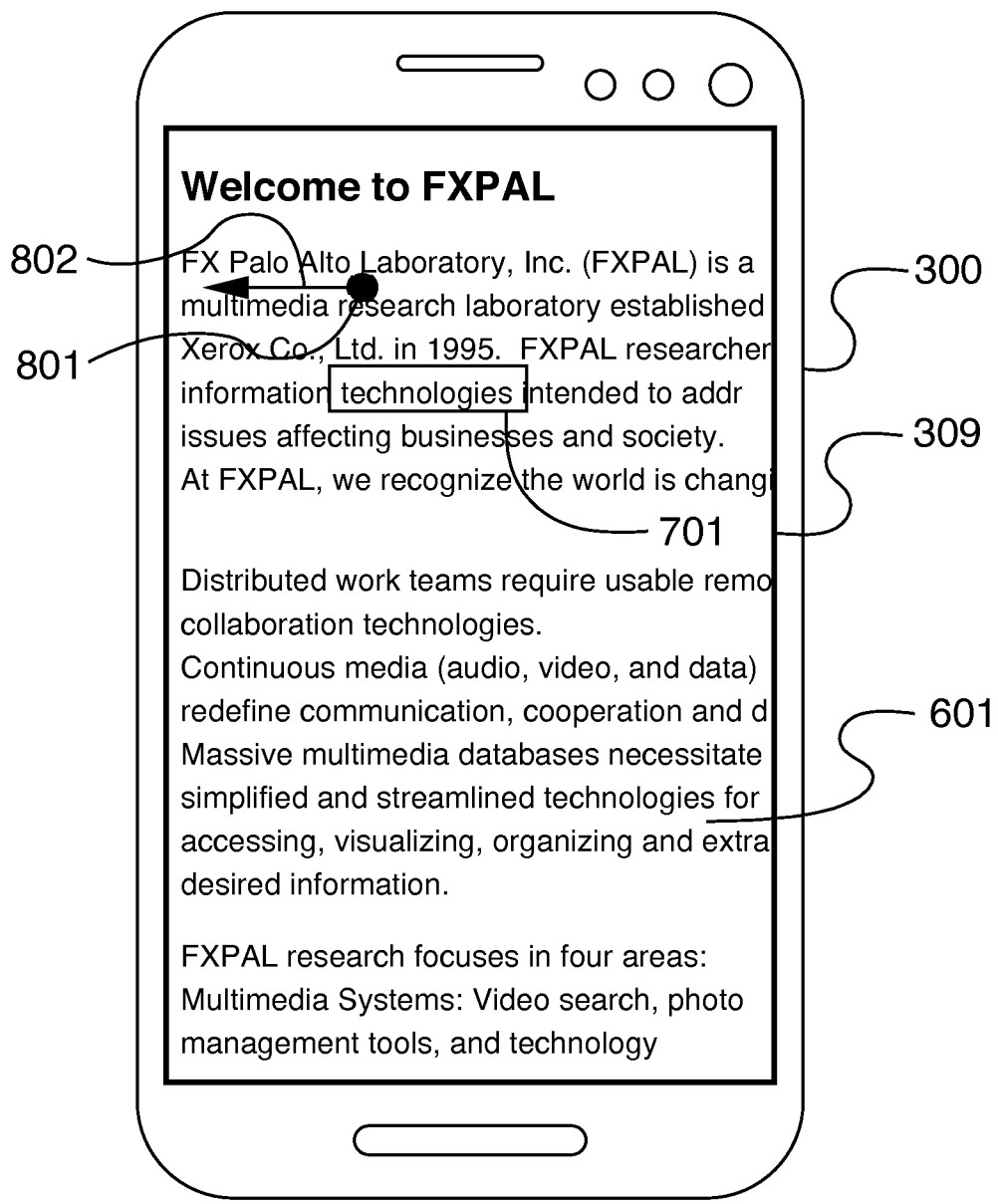
Figure 9:
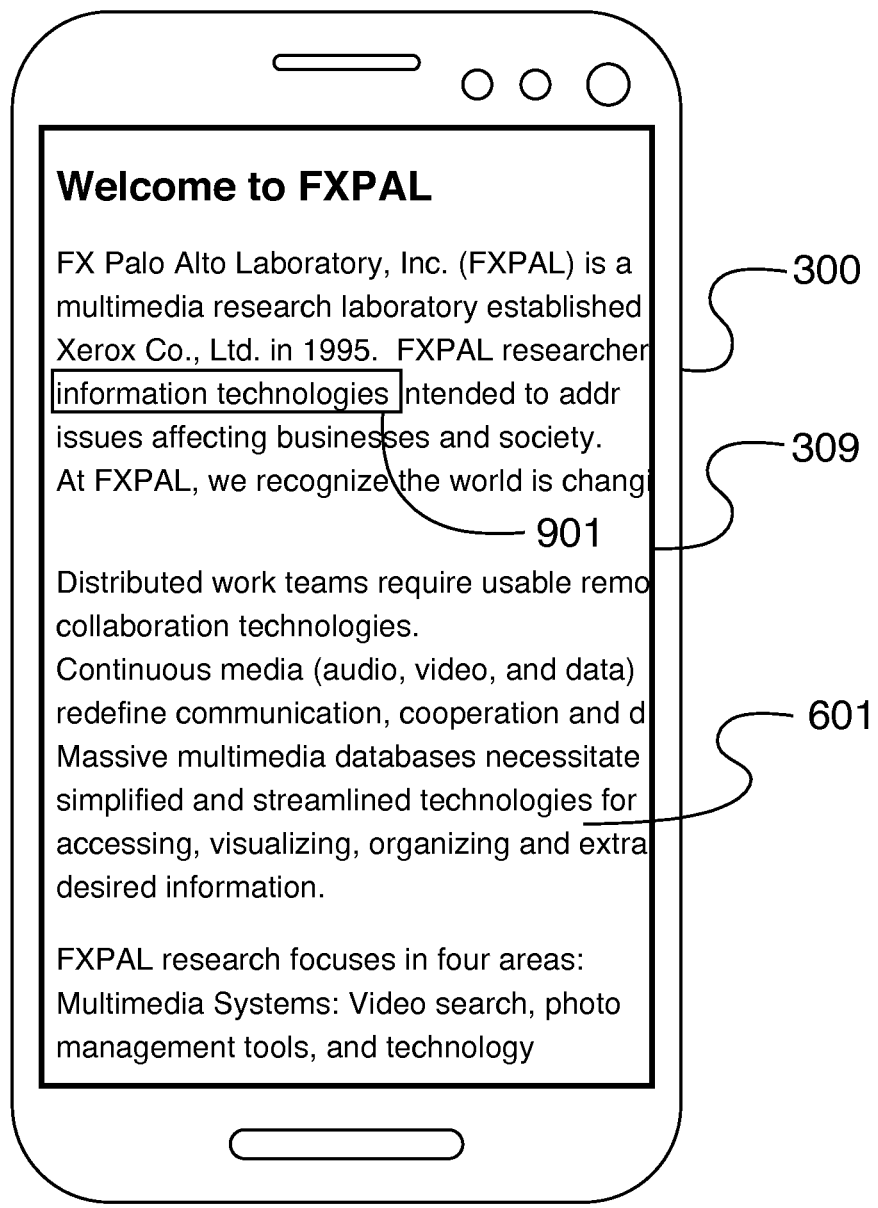
Figure 10:
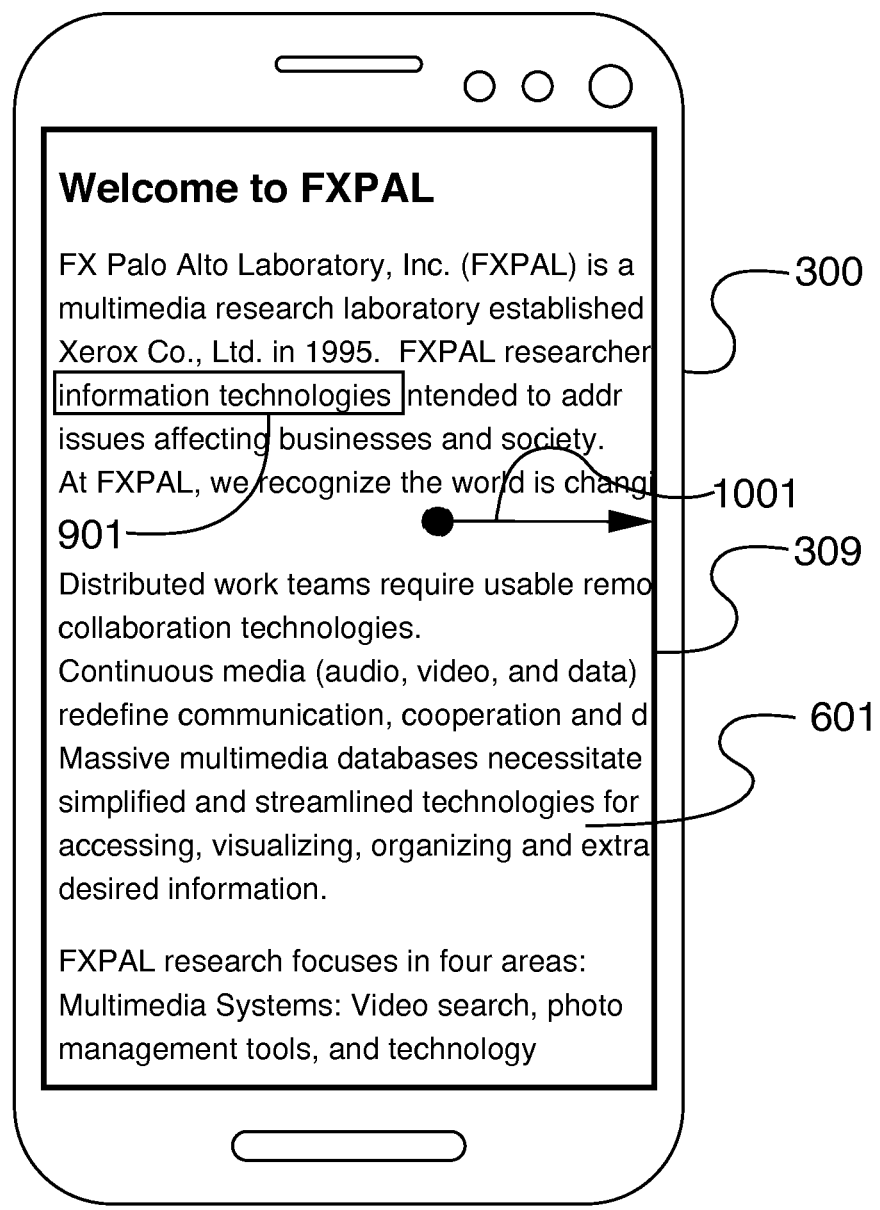
Figure 11:
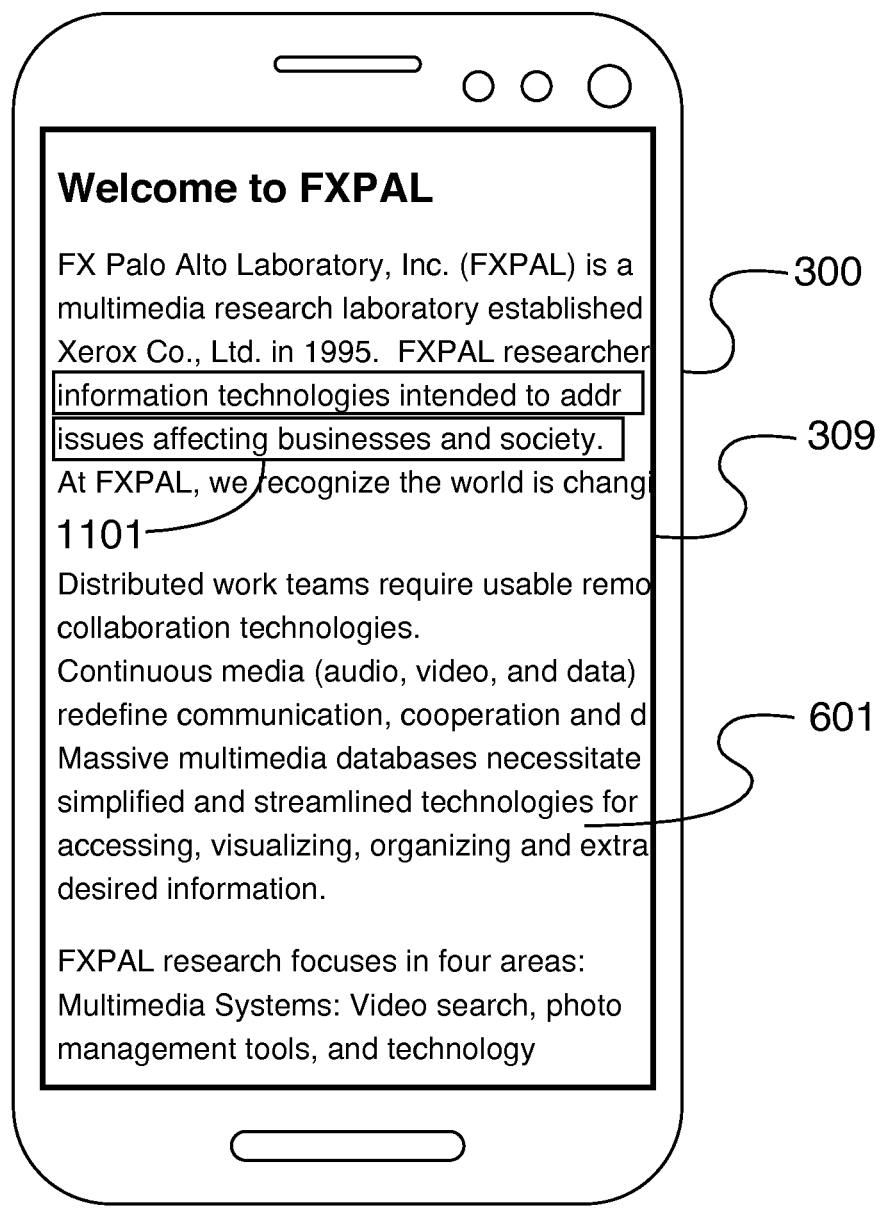
Figure 12:
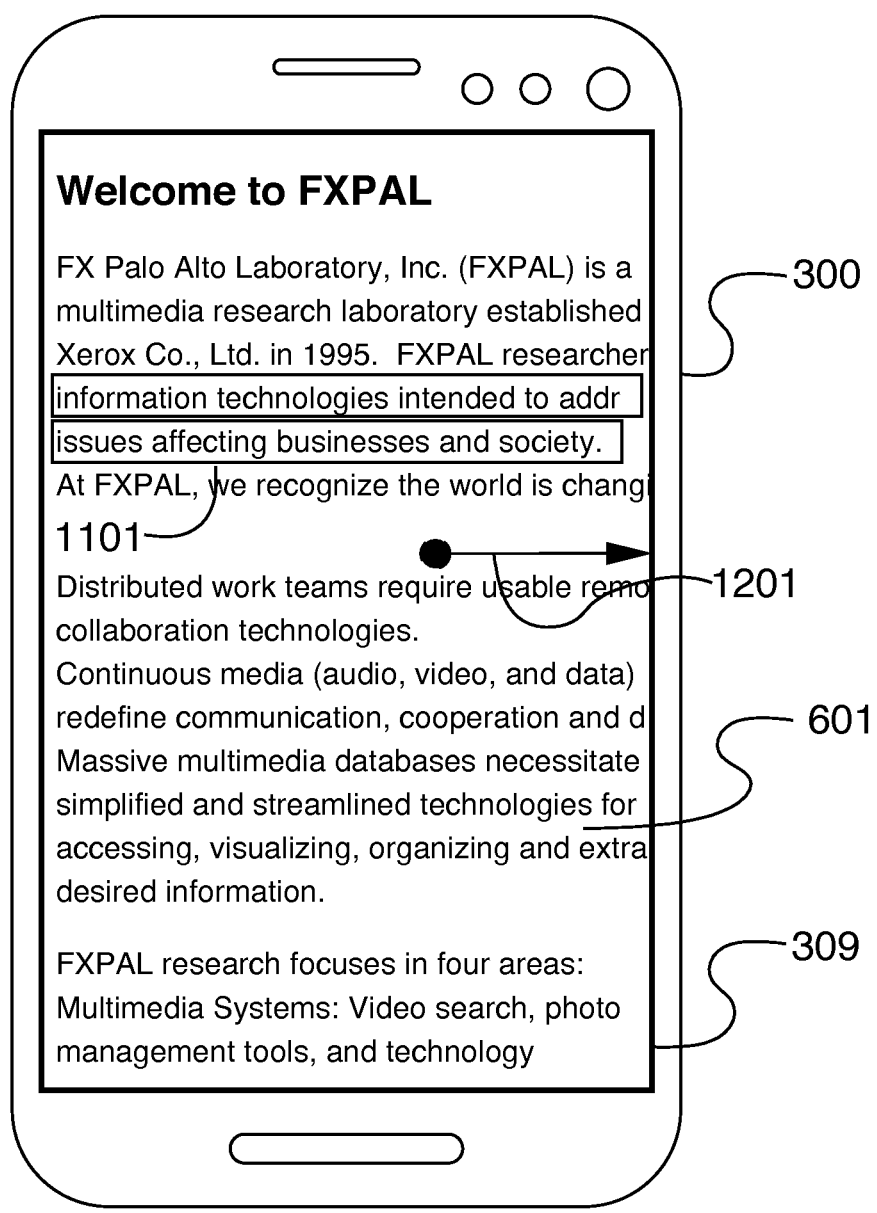
Figure 13:
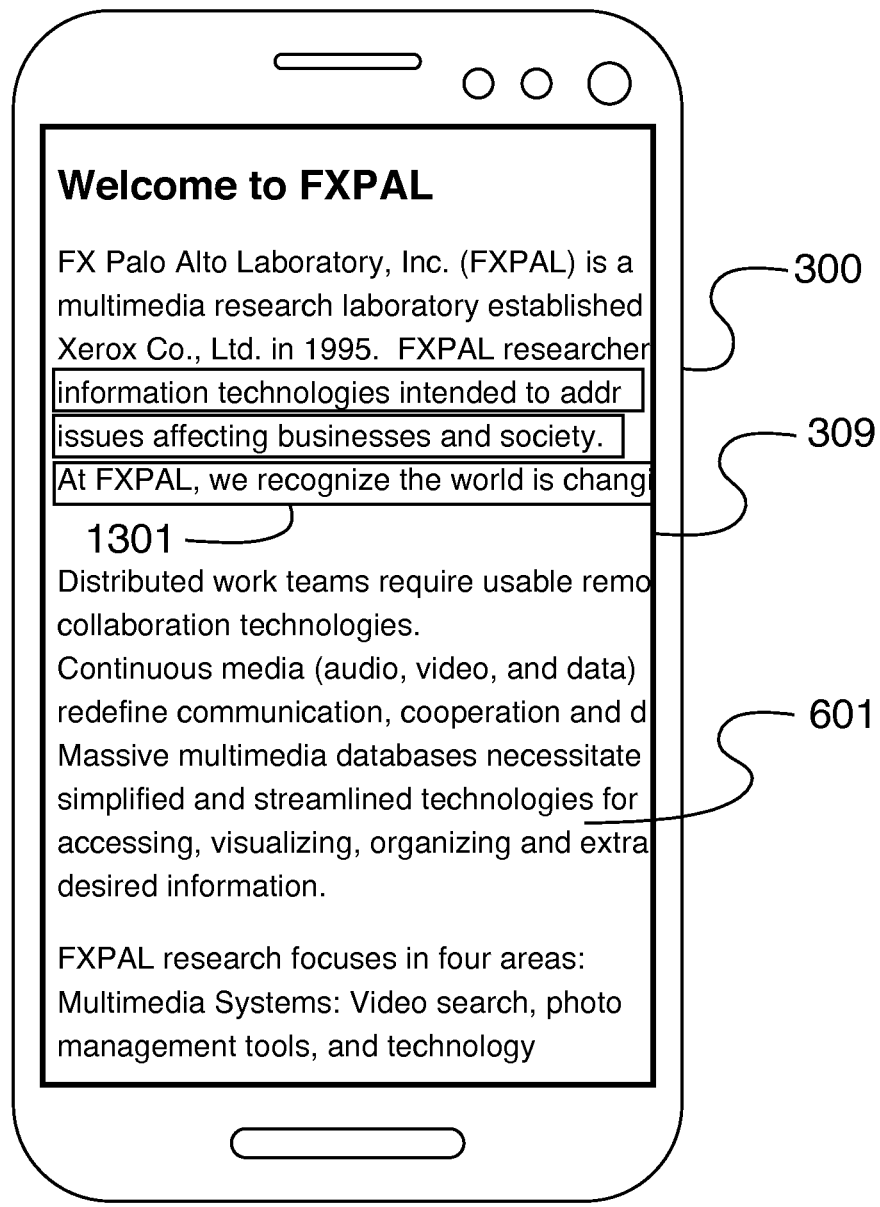

FIG. 8 illustrates an exemplary gesture performed by the user in connection with a textual content 601 displayed on a touch-sensitive display device 309 of the computerized system 300. The user first touches the display device 309 with his finger at a location 801 (above the initially marked word) and then swipes the finder to the left, as indicated by an arrow 802. Upon detection of the aforesaid gesture, the gesture analysis module 318 is configured to determine the type, position, direction and amplitude of the user's gesture. Based on the detected characteristics of the user's gesture, the selection adjustment module 319 (420) is configured to reposition the boundary of the content selection range as illustrated in FIG. 9. Specifically, in response to the detected gesture, the start of the content selection boundary marker 901 is extended to the left to encompass the words "information technologies".

In one or more embodiments, whether the start or the end of the content selection boundary is repositioned by the gesture and the direction in which the content selection boundary is moved depends on the position and direction of the user's gesture in relation to the current content selection range. In one or more embodiments, if the gesture location is higher (upstream) in the normal content flow than the current content selection range, then the start of the content selection range is affected by the gesture. Otherwise, the end of the content selection range is affected.

For example, assuming a normal horizontal content flow from the left top to the right bottom, similar to the text flow in Western languages, the vertical position of the gesture, as determined, for example, by the vertical position of the finger touch location 801 in FIG. 8, is used by the gesture analysis module 318 (419) to decide whether the start or the end of the content selection range is being affected by the gesture. In this example, if the gesture is higher than the current content selection range (as in FIG. 8), then the start of the content selection range will be affected. Otherwise, the end of the content selection range will be affected, as illustrated in FIGS. 10 through 15. On the other hand, if the gesture is on the same vertical level as the current content selection range, it will affect the start of the aforesaid range if the gesture is to the left with respect thereto and the end of the selection range, otherwise.

In one or more embodiments, the vertical position of the current content selection range is determined by the vertical position of its end. In an alternative embodiment, the start of the range may be used for this purpose, as it will allow the user to easily select downstream content not displayed on the display device 309. In yet another embodiment, the middle of the content selection range may also be used.

For content with different flow patterns, the aforesaid rules may change. For example, for content with normal vertical flow pattern from top left to bottom right, if the gesture is located to the left of the current content selection range, it will affect the start of the content selection range and the end of the selection range, otherwise.

In one or more embodiments, the direction of the gesture determines the direction of the movement of the content selection range boundary. In one example, the content selection range boundary is moved in the same general direction as the direction of the gesture. For example, with reference to FIGS. 8 and 9, the gesture designated by numerals 801 and 802 is directed to the left (upstream of the text flow) and the start of the content selection boundary is also moved to the left (upstream of the text flow), as indicated by the numeral 901 in FIG. 9.

In one or more embodiments, the amplitude of the user's gesture taken in conjunction with the content segmentation is used by the gesture analysis module 318 (419) to determine the extent of the repositioning of the content selection range boundary. Thus, in various embodiments, the content selection range is repositioned to the end of the word, line, sentence or paragraph depending on the amplitude of the gesture. In other words, the measured amplitude of the user's gesture determines the content segmentation boundary, to which the selection range is extended upon of the detection of such gesture. In one or more embodiments, the higher is the amplitude of the gesture, the higher is the level of the corresponding segmentation boundary.

Figure 14:
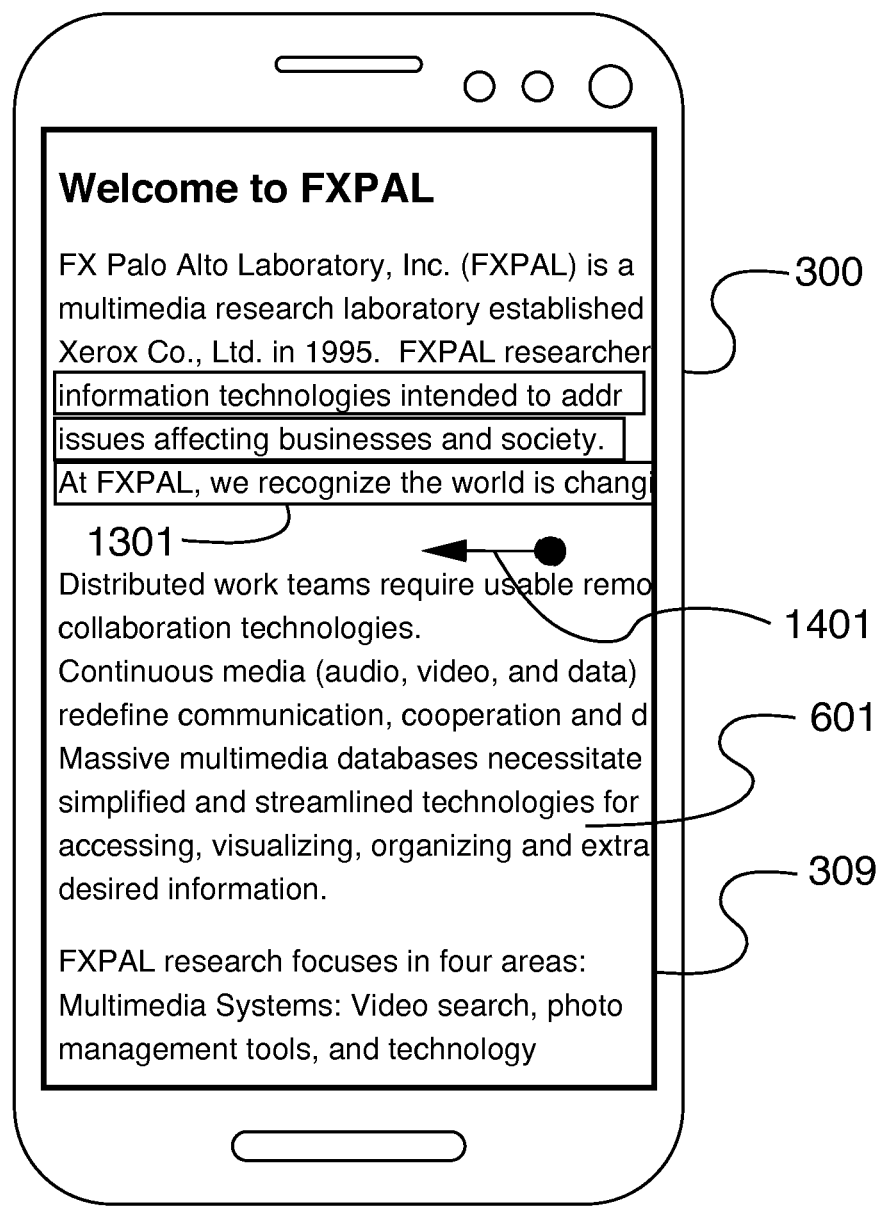
Figure 15:
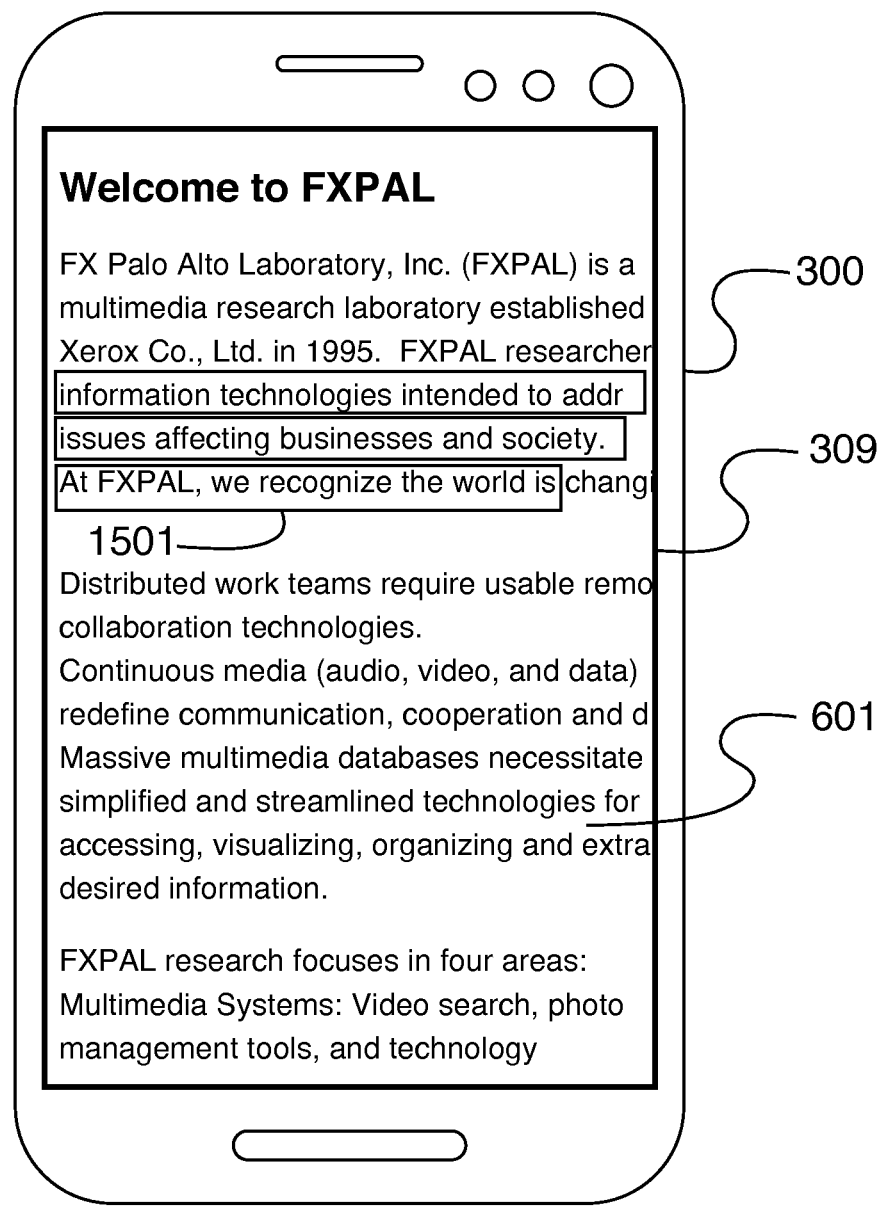

For example, with reference to FIGS. 8 and 9, a detection of a short gesture indicated by a short left arrow 802 in FIG. 8 causes the beginning of the selection range boundary to be moved to the beginning of the next word to the left, see FIG. 9. On the other hand, in another example, illustrated in FIGS. 10 and 11, the detection of a gesture of a higher amplitude 1001 in FIG. 10 causes the end boundary of the selection range to be extended to the end of the sentence, as indicated by the numeral 1101 in FIG. 11. Repeating this high amplitude gesture as indicated by numeral 1201 in FIG. 12 causes the end boundary of the selection range to be extended to the end of the next sentence, as indicated by the numeral 1301 in FIG. 13. Finally, the detected small amplitude gesture 1401 in the opposite direction, as shown in FIG. 14, causes the end boundary of the selection range to be moved to the beginning of the word to the left as shown by numeral 1501 in FIG. 15.

In other embodiments, depending on the amplitude of the gesture, the selection range boundary may move through multiple words, lines, expressions, sentences or paragraphs. In various embodiments, the type of the gesture may also determine the content segmentation boundary, to which the selection range is extended. For example, the detected swipe and flick gestures may result in different extent of selection boundary repositioning.

In one or more embodiments, besides the described examples, additional content segmentation boundaries may be established by semantic grouping of words using various techniques well known to persons of ordinary skill in the art. In various embodiments, words may be grouped together using speech tagging or name entity recognition. For example, if the user selects word "Alto" in the content shown in FIG. 7 and makes flick gestures to extend the start and end boundaries of the content selection range, the text entity extractor would define a boundary around "FX Palo Alto Laboratory" and the selection range would stop at this boundary, unless the user keeps making swipe or flick gestures.

In one or more embodiments, in case the textual content itself is not available in the text form, the selection adjustment module 319 (420) is configured to rely on well-known page image segmentation algorithms to identify line and paragraph boundaries, and apply the same techniques as described above. In one embodiment, the selection adjustment module 319 (420) is configured to slow down the movement of the boundary of the selection range when it reaches a content segmentation boundary. However, the user needs not lift her finger if she wants to keep moving past this segmentation boundary: she simply will need to travel a little bit more space on the display device before the selection range boundary moves past that point.

FIGS. 16, 17, 18, 19 and 20 illustrate various aspects of operation of another embodiment of the inventive concepts described herein for enabling a user to select a portion of a non-textual content 1600 displayed on a touch-sensitive display device 309. Specifically, the displayed content 1600 is non-textual and is segmented into content clusters (segments) 1601, 1602, 1603 and 1604 based on spatial, temporal or contextual proximity of the graphical primitives (elements) of the displayed content 1600. Additional content segmentation may be performed based on slides or pages containing multiple content clusters.

Figure 16:
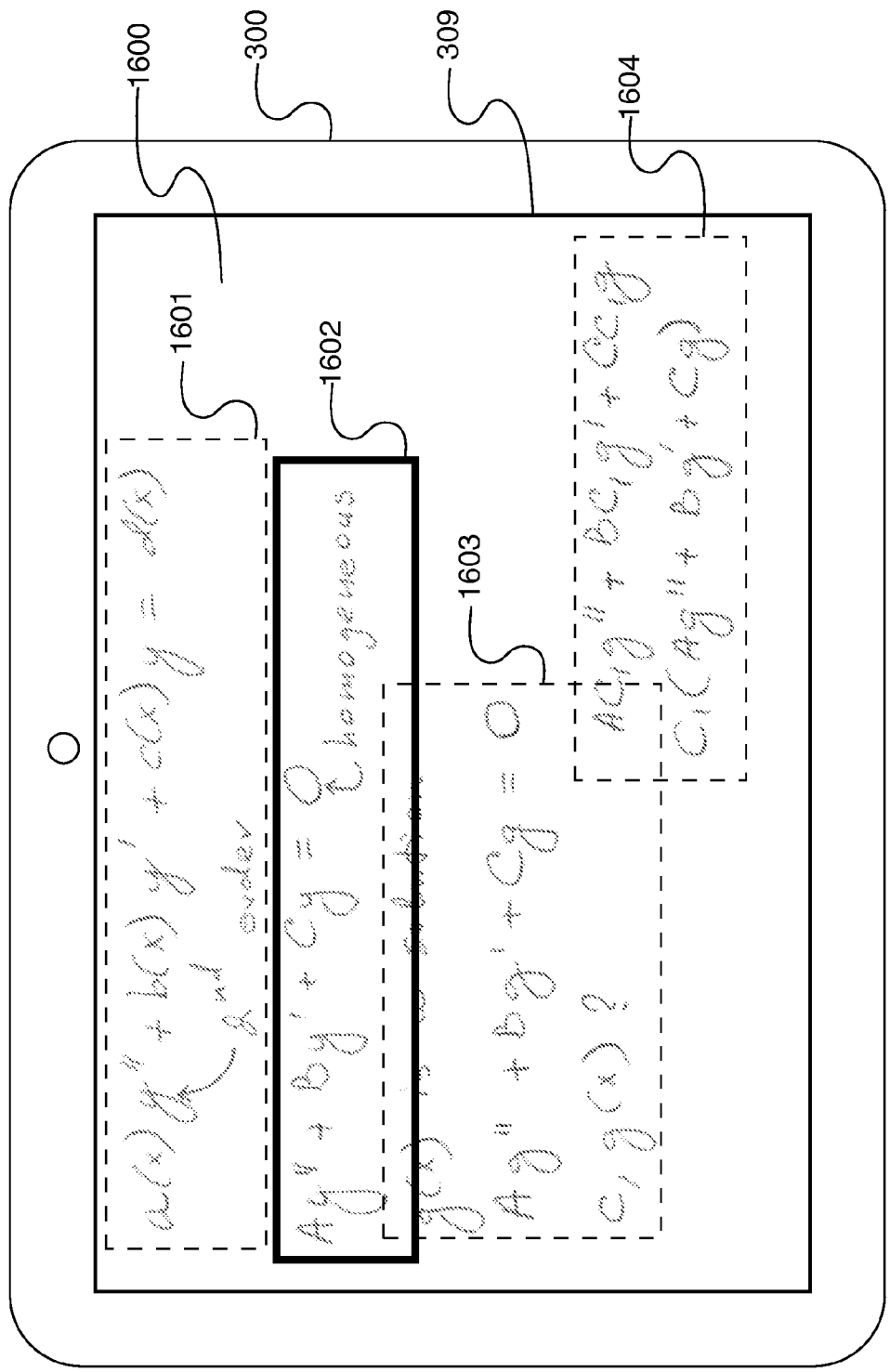
FIGS. 16, 17, 18, 19 and 20 illustrate various aspects of operation of another embodiment of the inventive concepts described herein for enabling a user to select a portion of a non-textual content displayed on a touch-sensitive electronic display device.
Figure 17:
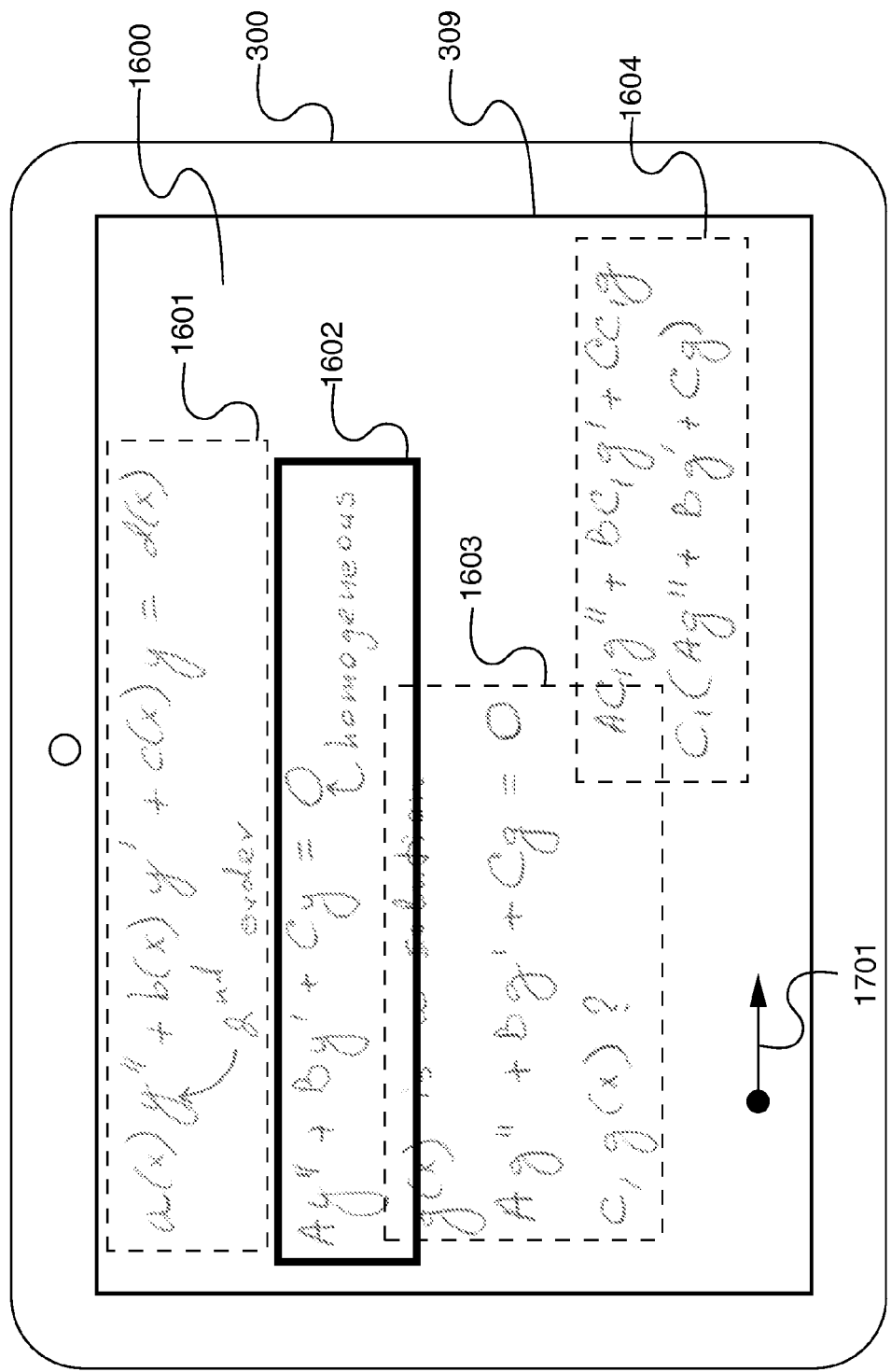
Figure 18:
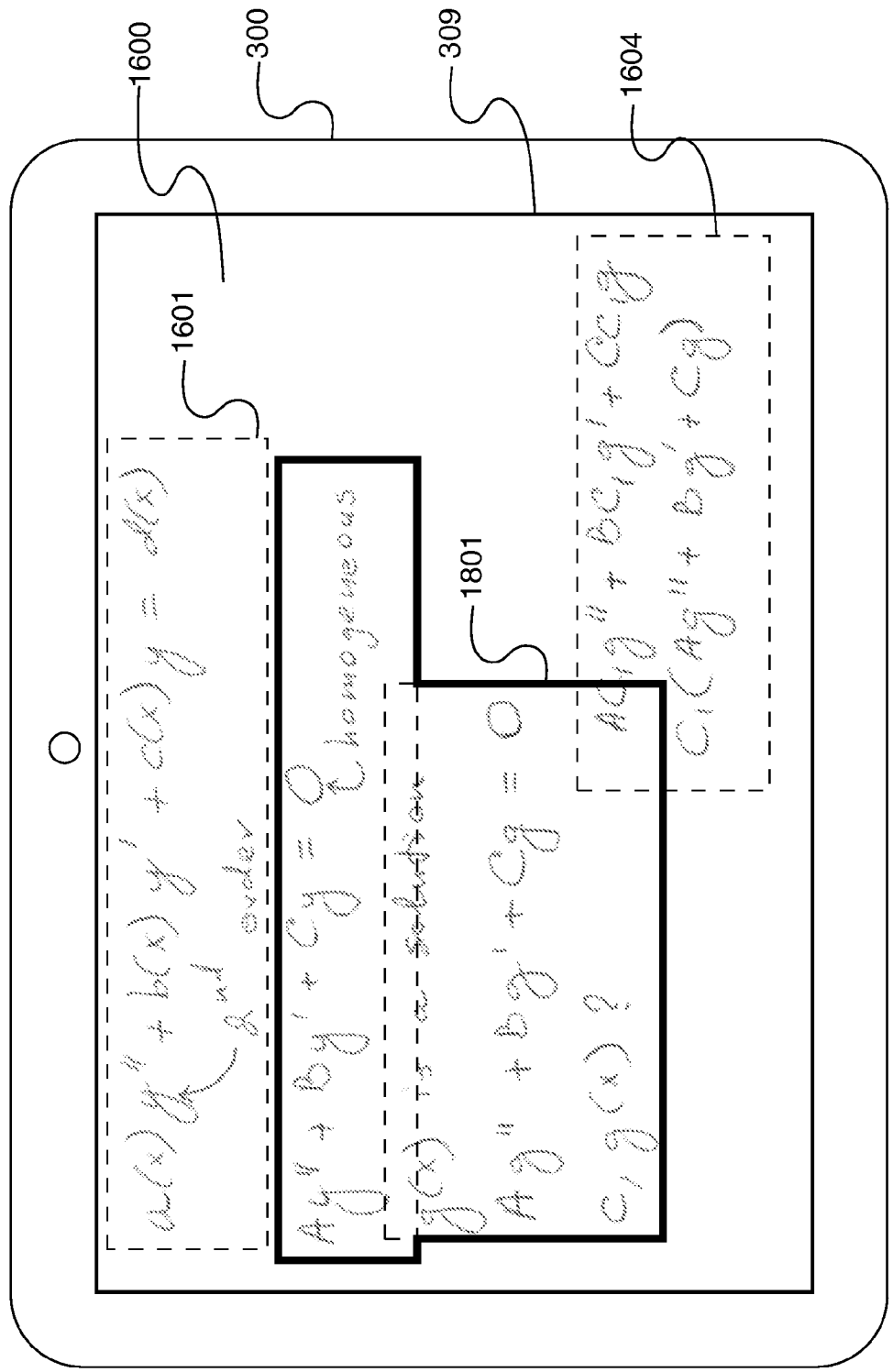
Figure 19:
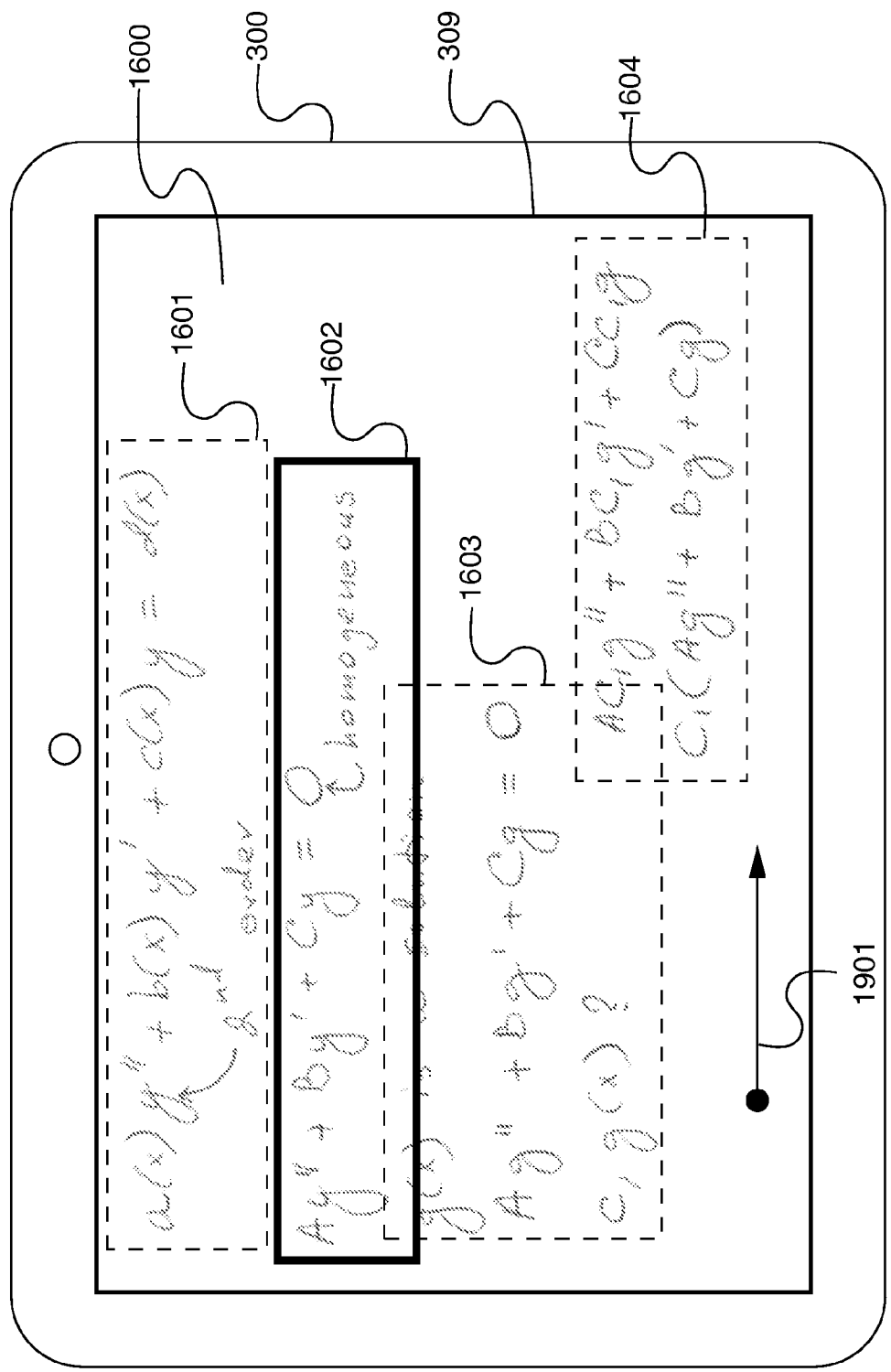
Figure 20:
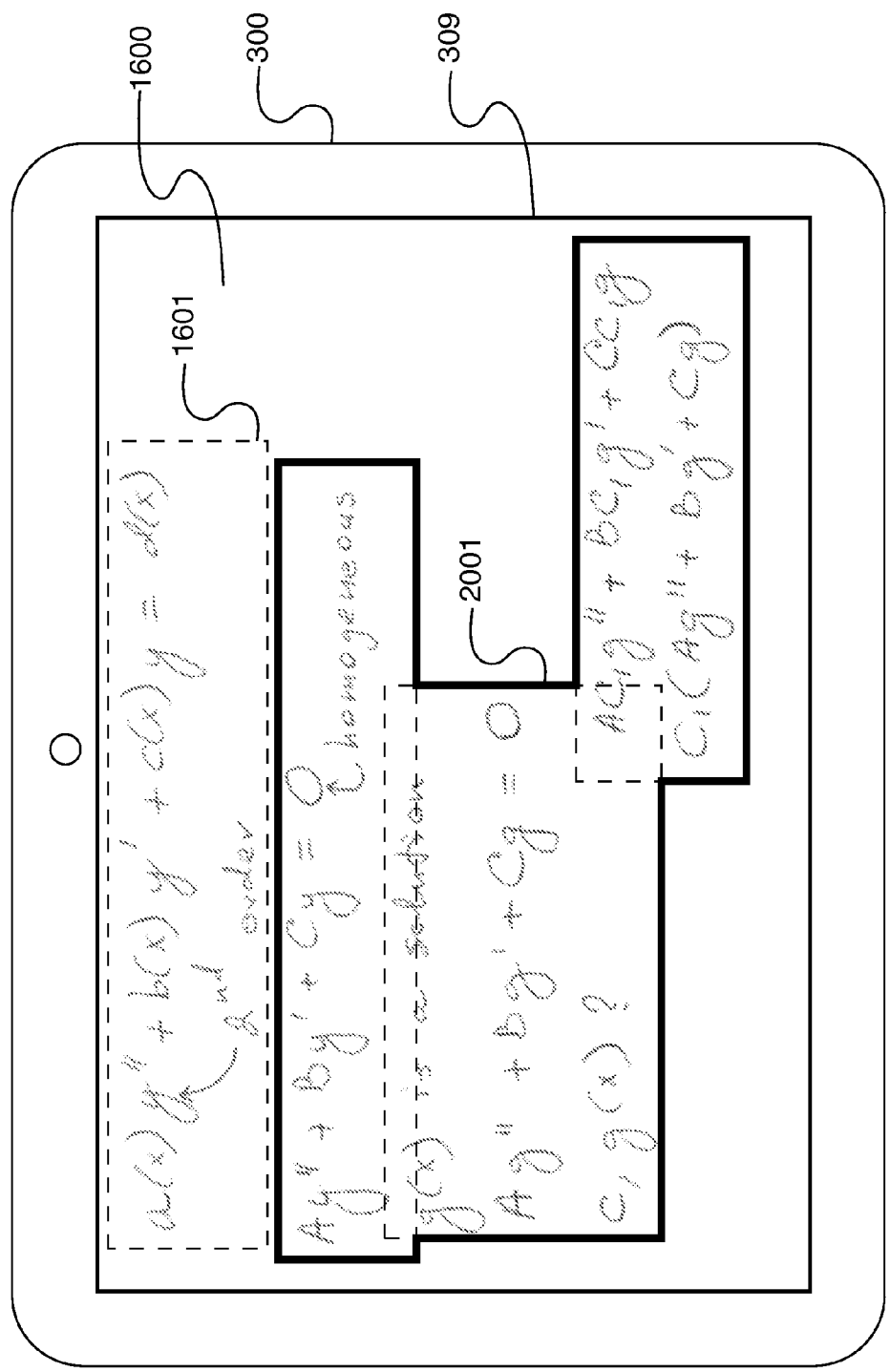

As in the above-described embodiment directed to the textual content, the user first makes an initial selection of the target content cluster 1602, which is marked, for example, with a bold content selection boundary shown in FIG. 16. Subsequently, in response to the detection of user's gesture 1701 downstream of the initial selection 1602 as shown in FIG. 17, the selection adjustment module 319 (420) is configured to extend the content selection boundary 1801 downstream to additionally include the content cluster 1603, as illustrated in FIG. 18. It should be noted that in the shown embodiment, the next content cluster 1603 represents a first segmentation boundary of the non-textual content 1600. Finally, in response to a higher amplitude gesture 1901, shown in FIG. 19, the selection adjustment module 319 (420) is configured to extend the content selection boundary 1602 all the way to the end of the content 1600 (the end of the content slide), as shown by numeral 2001 in FIG. 20, which represents the next (second) content segmentation boundary (end of the content slide) for the non-textual content 1600. Thus, as would be appreciated by persons of skill in the art, the operation of this embodiment of the described content selection system is substantially similar to the operation of the embodiment illustrated in connection with FIGS. 6-15.

It should be emphasized that the novel content selection techniques described herein may be fully implemented without the use of the touch-sensitive display devices. As noted above, various user gestures may be detected using a variety of various sensory devices, including, without limitation, cameras, touchpads, accelerometers, as well as any other now known or later developed sensory devices. Thus, the invention is not limited to any specific means for user gesture detection.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for enabling a user to select a portion of a content displayed on a touch-sensitive electronic display device. It is intended that the specification and examples be considered as exemplary only, with a true scope and spirit of the invention being indicated by the following claims.

What is claimed is:

1. A computer-implemented method performed in a computerized system comprising a central processing unit, a display device and a memory, the computer-implemented method comprising:
   a. displaying a segmented content on the display device, wherein the content is segmented using a plurality of content segmentation boundaries comprising word boundaries, sentence boundaries, paragraph boundaries or chapter boundaries located within the content;
   b. detecting an initial selection of a portion of the displayed segmented content by a user and marking a boundary of the selected portion of the displayed segmented content on the display device;
   c. while continuing to mark on the display device the boundary of the selected portion, detecting a swipe or flick gesture of the user outside of the marked boundary of the selected portion of the displayed segmented content, wherein a starting point of the detected user gesture is outside of a start portion of the boundary and an end portion of the boundary of the selected portion;
   d. responsive to the detecting of the gesture, using the central processing unit to reposition at least a portion of the boundary of the initially selected portion of the displayed segmented content based on at least one characteristic of the gesture and the segmentation of the content, wherein a location of the detected gesture in relation to the selected portion of the displayed content determines whether the start portion of the boundary of the selected portion of the displayed content or the end portion of the boundary of the selected portion of the displayed content is repositioned, wherein when the gesture is detected above the selected portion of the displayed segmented content, the start portion of the boundary of the selected portion of the displayed content is repositioned and when the gesture is detected below the selected portion of the displayed segmented content, the end portion of the boundary of the selected portion of the displayed content is repositioned and wherein the portion of the boundary of the selected portion of the displayed content is repositioned based on the word boundaries, sentence boundaries, paragraph boundaries or chapter boundaries located within the content; and
   e. marking the repositioned boundary of the selected portion of the segmented content on the display device.

2. The computer-implemented method of claim 1, further comprising repeating c. through e. for at least one additional gesture of the user.

3. The computer-implemented method of claim 1, wherein the segmented content comprises a textual content segmented based on at least one of: word boundaries, expression boundaries, sentence boundaries or punctuations.

4. The computer-implemented method of claim 1, wherein the segmented content comprises a graphical content comprising a plurality of graphical elements clustered into a plurality of segments based of spatial, temporal or contextual proximity.

5. The computer-implemented method of claim 1, wherein the extent of the repositioning of the portion of the boundary of the selected portion of the displayed content is based at least on a type of the gesture.

6. The computer-implemented method of claim 1, wherein a starting point of the detected user gesture is outside of a close proximity of the start portion of the boundary and the end portion of the boundary of the selected portion.

7. The computer-implemented method of claim 1, wherein the content is segmented using a plurality of content segmentation boundaries located within the content.

8. The computer-implemented method of claim 7, wherein the portion of the boundary of the selected portion of the displayed content is repositioned to a location of one of the plurality of content segmentation boundaries.

9. The computer-implemented method of claim 7, wherein the plurality of content segmentation boundaries comprises at least word boundaries and sentence boundaries.

10. The computer-implemented method of claim 7, wherein the plurality of content segmentation boundaries are defined by at least white spaces and punctuations.

11. The computer-implemented method of claim 7, wherein the repositioning of the at least a portion of the boundary of the selected portion of the displayed content is slowed when the repositioned portion of the boundary reaches one of the plurality of content segmentation boundaries.

12. The computer-implemented method of claim 1, wherein the portion of the boundary of the selected portion of the displayed content is repositioned in a same direction as a direction of the gesture.

13. The computer-implemented method of claim 1, wherein the gesture is detected independently of a keyboard of the computerized system.

14. The computer-implemented method of claim 1, wherein the extent of the repositioning of the at least a portion of the boundary of the selected portion of the displayed content is based at least on an amplitude of the gesture.

15. The computer-implemented method of claim 14, wherein the content is segmented using a plurality of content segmentation boundaries located within the content and wherein the extent of the repositioning of the at least a portion of the boundary of the selected portion of the displayed content is additionally based on the content segmentation boundaries.

16. The computer-implemented method of claim 1, wherein at least a portion of the gesture of the user is detected inside the marked boundary of the selected portion of the displayed segmented content.

17. A non-transitory computer-readable medium embodying a set of computer-executable instructions, which, when executed in a computerized system comprising a central processing unit, a display device and a memory, cause the computerized system to perform a method comprising:
   a. displaying a segmented content on the display device, wherein the content is segmented using a plurality of content segmentation boundaries comprising word boundaries, sentence boundaries, paragraph boundaries or chapter boundaries located within the content;
   b. detecting an initial selection of a portion of the displayed segmented content by a user and marking a boundary of the selected portion of the displayed segmented content on the display device;
   c. while continuing to mark on the display device the boundary of the selected portion, detecting a swipe or flick gesture of the user outside of the marked boundary of the selected portion of the displayed segmented content, wherein a starting point of the detected user gesture is outside of a start portion of the boundary and an end portion of the boundary of the selected portion;
   d. responsive to the detecting of the gesture, using the central processing unit to reposition at least a portion of the boundary of the initially selected portion of the displayed segmented content based on at least one characteristic of the gesture and the segmentation of the content, wherein a location of the detected gesture in relation to the selected portion of the displayed content determines whether the start portion of the boundary of the selected portion of the displayed content or the end portion of the boundary of the selected portion of the displayed content is repositioned, wherein when the gesture is detected above the selected portion of the displayed segmented content, the start portion of the boundary of the selected portion of the displayed content is repositioned and when the gesture is detected below the selected portion of the displayed segmented content, the end portion of the boundary of the selected portion of the displayed content is repositioned and wherein the portion of the boundary of the selected portion of the displayed content is repositioned based on the word boundaries, sentence boundaries, paragraph boundaries or chapter boundaries located within the content; and
   e. marking the repositioned boundary of the selected portion of the segmented content on the display device.

18. A computerized system comprising a processing unit, a display device and a memory, the memory storing:
   a. a user interface generation module for causing a segmented content to be displayed on the display device, wherein the content is segmented using a plurality of content segmentation boundaries comprising word boundaries, sentence boundaries, paragraph boundaries or chapter boundaries located within the content;
   b. an initial selection module for detecting an initial selection of a portion of the displayed segmented content by a user and causing a boundary of the selected portion of the displayed segmented content to be marked on the display device;
   c. a gesture analysis module for detecting a swipe or flick gesture of the user outside of the marked boundary of the selected portion of the displayed segmented content, wherein the boundary of the selected portion continues to be marked on the display device during the detecting, wherein a starting point of the detected user gesture is outside of a start portion of the boundary and an end portion of the boundary of the selected portion; and
   d. a selection adjustment module for, responsively to the detecting of the gesture, causing the processing unit to reposition at least a portion of the boundary of the initially selected portion of the displayed segmented content based on at least one characteristic of the gesture and a segmentation of the content and causing the repositioned boundary of the selected portion of the segmented content to be marked on the display device, wherein a location of the detected gesture in relation to the selected portion of the displayed content determines whether the start portion of the boundary of the selected portion of the displayed content or the end portion of the boundary of the selected portion of the displayed content is repositioned, wherein when the gesture is detected above the selected portion of the displayed segmented content, the start portion of the boundary of the selected portion of the displayed content is repositioned and when the gesture is detected below the selected portion of the displayed segmented content, the end portion of the boundary of the selected portion of the displayed content is repositioned and wherein the portion of the boundary of the selected portion of the displayed content is repositioned based on the word boundaries, sentence boundaries, paragraph boundaries or chapter boundaries located within the content.

19. A computer-implemented method performed in a computerized system comprising a central processing unit, a display device and a memory, the computer-implemented method comprising:
 a. displaying a content on the display device, wherein the content is segmented using a plurality of content segmentation boundaries comprising word boundaries, sentence boundaries, paragraph boundaries or chapter boundaries located within the content;
 b. detecting an initial selection of a portion of the displayed content by a user and marking a boundary of the selected portion of the displayed content on the display device;
 c. while continuing to mark on the display device the boundary of the selected portion, detecting a swipe or flick gesture of the user outside of the marked boundary of the selected portion of the displayed content, wherein a starting point of the detected user gesture is outside of a start portion of the boundary and an end portion of the boundary of the selected portion;
 d. responsive to the detecting of the gesture, using the central processing unit to reposition at least a portion of the boundary of the selected portion of the displayed content based on at least one characteristic of the gesture wherein a location of the detected gesture in relation to the selected portion of the displayed content determines whether the start portion of the boundary of the selected portion of the displayed content or the end portion of the boundary of the selected portion of the displayed content is repositioned; and
 e. marking the repositioned boundary of the selected portion of the content on the display device, wherein when the gesture is detected upstream of the selected portion of the displayed content, the start portion of the boundary of the initially selected portion of the displayed content is repositioned and wherein when the gesture is detected downstream of the selected portion of the displayed content, the end portion of the boundary of the selected portion of the displayed content is repositioned and wherein the portion of the boundary of the selected portion of the displayed content is repositioned based on the word boundaries, sentence boundaries, paragraph boundaries or chapter boundaries located within the content.

* * * * *